United States Patent [19]

Kimura et al.

[11] Patent Number: 4,739,801
[45] Date of Patent: Apr. 26, 1988

[54] FLEXIBLE SUPPORTING SHEATH FOR CABLES AND THE LIKE

[75] Inventors: Akira Kimura, Kyoto; Nobuo Kitao, Yamatokouriyama; Hiroshi Yasuda, Takatsuki; Yoshimasa Shimomura, Daito; Kiyoshi Isozaki; Hiroshi Nishimura, both of Osaka, all of Japan

[73] Assignee: Tysubakimoto Chain Co., Osaka, Japan

[21] Appl. No.: 849,029

[22] Filed: Apr. 7, 1986

[30] Foreign Application Priority Data

| Apr. 9, 1985 | [JP] | Japan | 60-75698 |
| Apr. 22, 1985 | [JP] | Japan | 60-86983 |
| Feb. 15, 1986 | [JP] | Japan | 61-29917 |
| Feb. 17, 1986 | [JP] | Japan | 61-30951 |
| Feb. 18, 1986 | [JP] | Japan | 61-31932 |
| Feb. 19, 1986 | [JP] | Japan | 61-32879 |

[51] Int. Cl.[4] ............................................. F16L 27/04
[52] U.S. Cl. .................................... 138/120; 174/68 C; 285/137.1; 285/155; 285/156; 285/166 285/261; 285/404; 285/921
[58] Field of Search ............... 285/166, 167; 138/120, 138/155; 403/56; 174/68 C, 111

[56] References Cited

U.S. PATENT DOCUMENTS

| 205,069 | 6/1878 | Farnsworth | 285/166 |
| 536,419 | 3/1895 | Cochrane | 138/120 X |
| 1,001,842 | 8/1911 | Greenfield | 138/120 X |
| 1,271,179 | 7/1918 | Langton et al. | 285/167 |
| 1,276,117 | 8/1918 | Riebe | 138/120 X |
| 1,500,921 | 7/1924 | Bramson et al. | 285/166 |
| 2,696,264 | 12/1954 | Colmerauer et al. | 138/120 X |
| 3,433,504 | 3/1969 | Hanes | 285/166 X |
| 4,396,797 | 8/1983 | Sakuragi et al. | 138/120 X |

FOREIGN PATENT DOCUMENTS

| 62953 | 7/1892 | Fed. Rep. of Germany | 138/120 |
| 604542 | 10/1934 | Fed. Rep. of Germany | 174/111 |
| 339757 | 4/1904 | France | 138/120 |
| 1098836 | 3/1955 | France | 138/120 |
| 350359 | 7/1937 | Italy | 138/120 |
| 592381 | 9/1947 | United Kingdom | 138/120 |
| 2013810 | 8/1979 | United Kingdom | 285/166 |

Primary Examiner—Thomas F. Callaghan
Attorney, Agent, or Firm—Howson and Howson

[57] ABSTRACT

A universally articulable supporting sheath comprises an interconnected series of links, each having a convex spherical surface at one end, and a concave spherical surface at its opposite end. The concave and convex surfaces mate with one another to form the sheath. Special links having branch openings may be provided. Various forms of waterproofing seals are provided, including O-rings, axially compressed rings, flexible belts, and ridges on the spherical surfaces. The links can be fitted together by thermal expansion. However, an axilly split link is also described, which comprises two parts which snap together. The split parts may be molded as a unit with an integral thin wall hinge. The bending characteristics and bending radius of a sheath can be modified by insertion of spacers between the links at selected locations, or by the insertion of pins into radial holes provided in the links. Spacers with tongues may be used to prevent rotation of the links about the sheath axis, while allowing unidirectional articulation. Projections on one of a pair of mating spherical surfaces can be engaged with holes, slots or recesses of rectangular or other shapes to produce various limits on articulation and rotation. A single link may be provided iwth several alternatively usable holes, recesses and the like. The outer surface of a link can be provided iwth an axial extension engageable with a surface of an adjoining link to prevent back bending, or to prevent bending altogether.

3 Claims, 29 Drawing Sheets

FIG. 8A
FIG. 8B
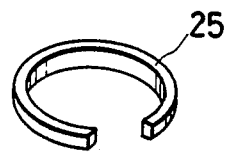
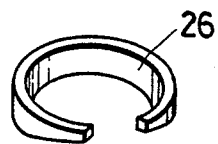
FIG. 9
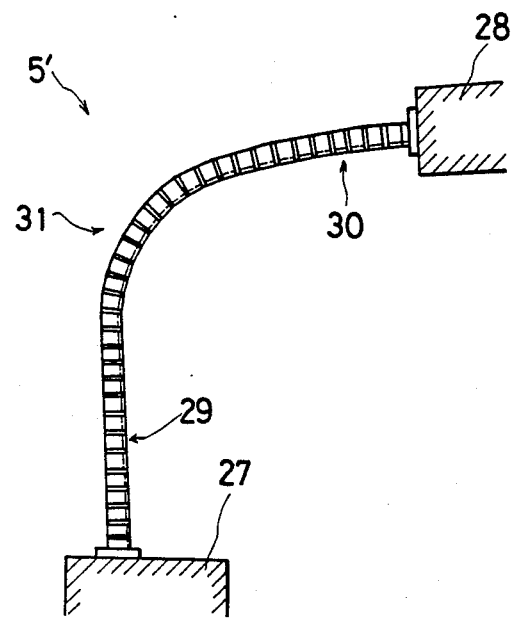

FIG. 13
FIG. 14
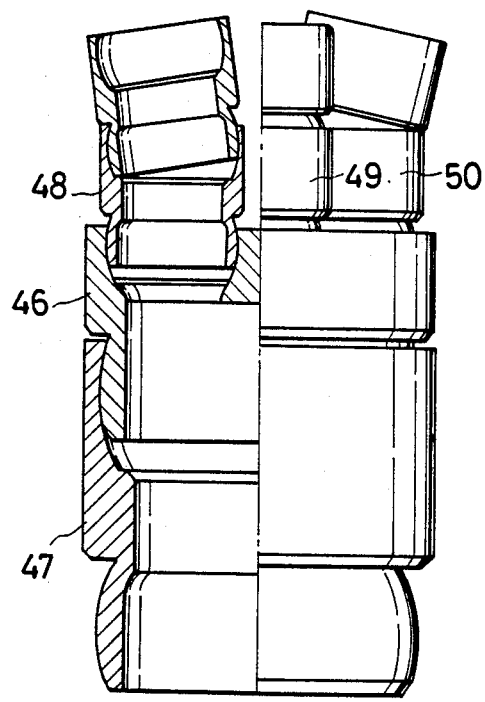
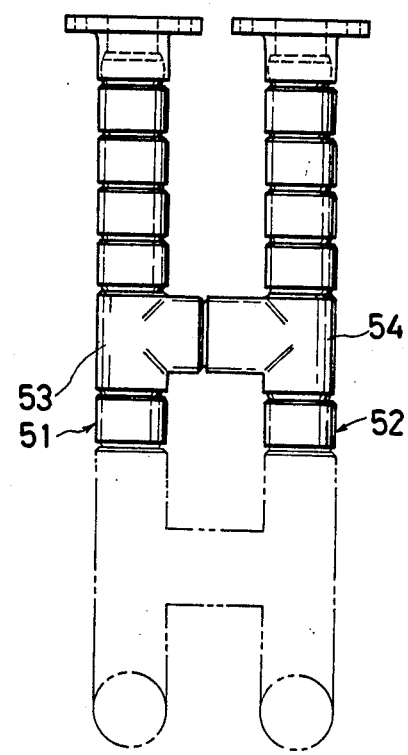

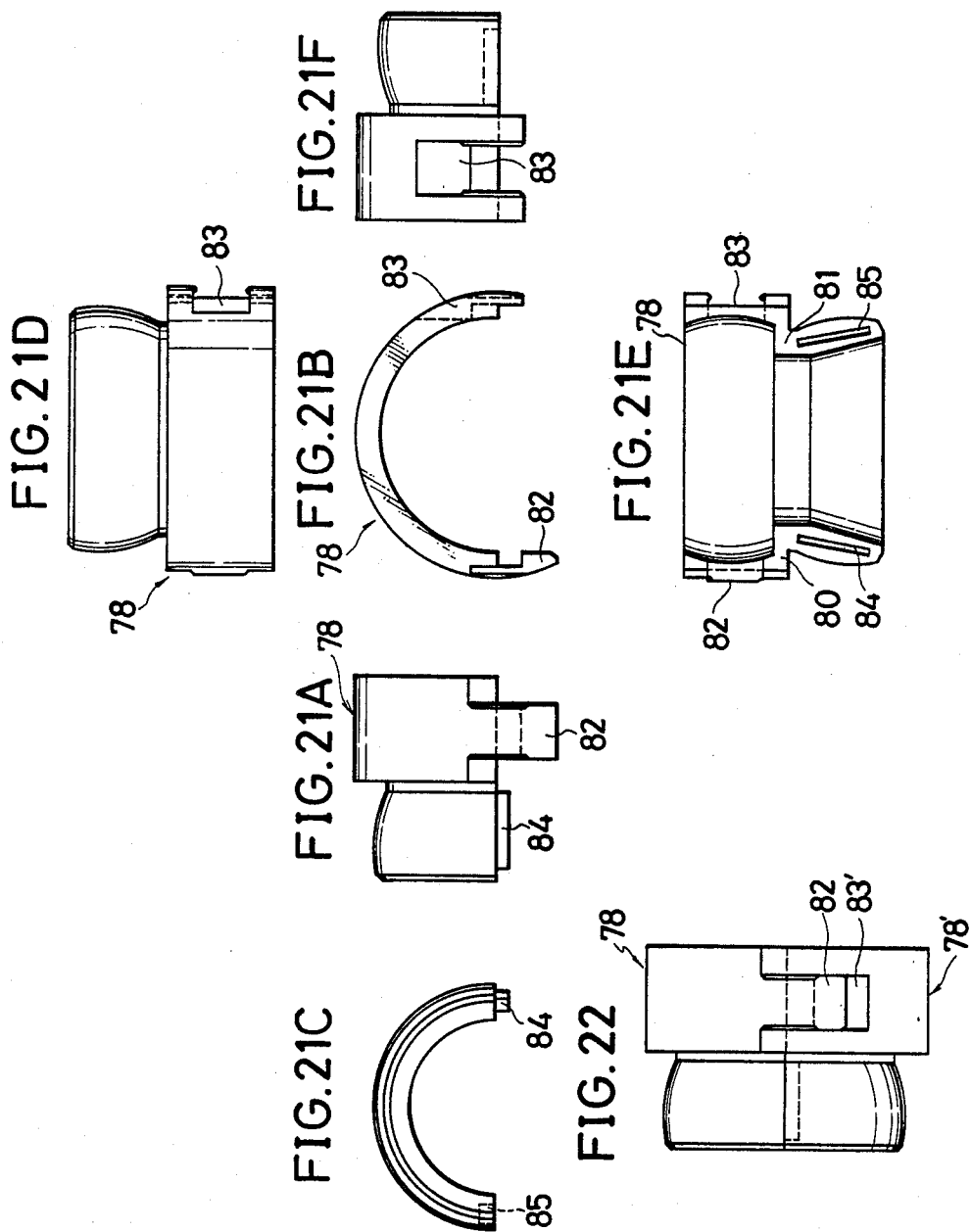

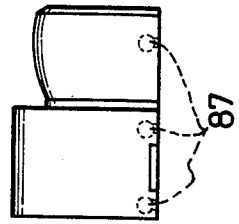
FIG.23F
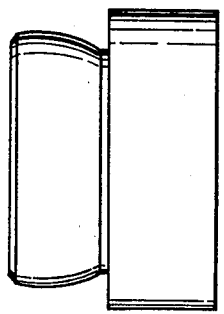
FIG.23D
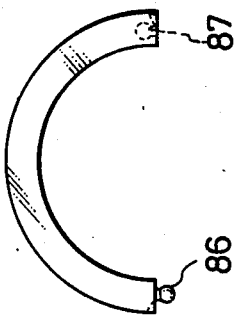
FIG.23B
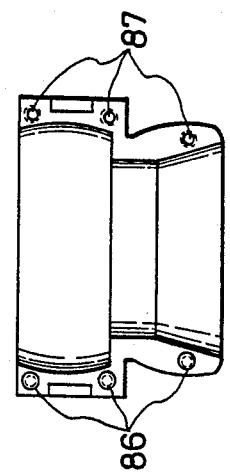
FIG.23E
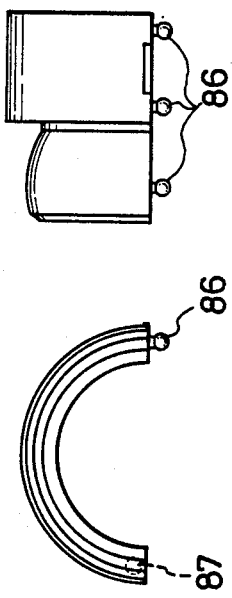
FIG.23A
FIG.23C
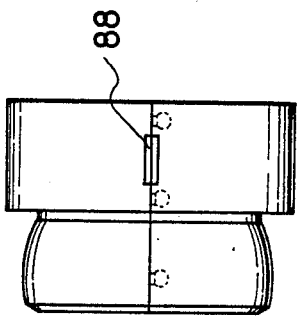
FIG.24

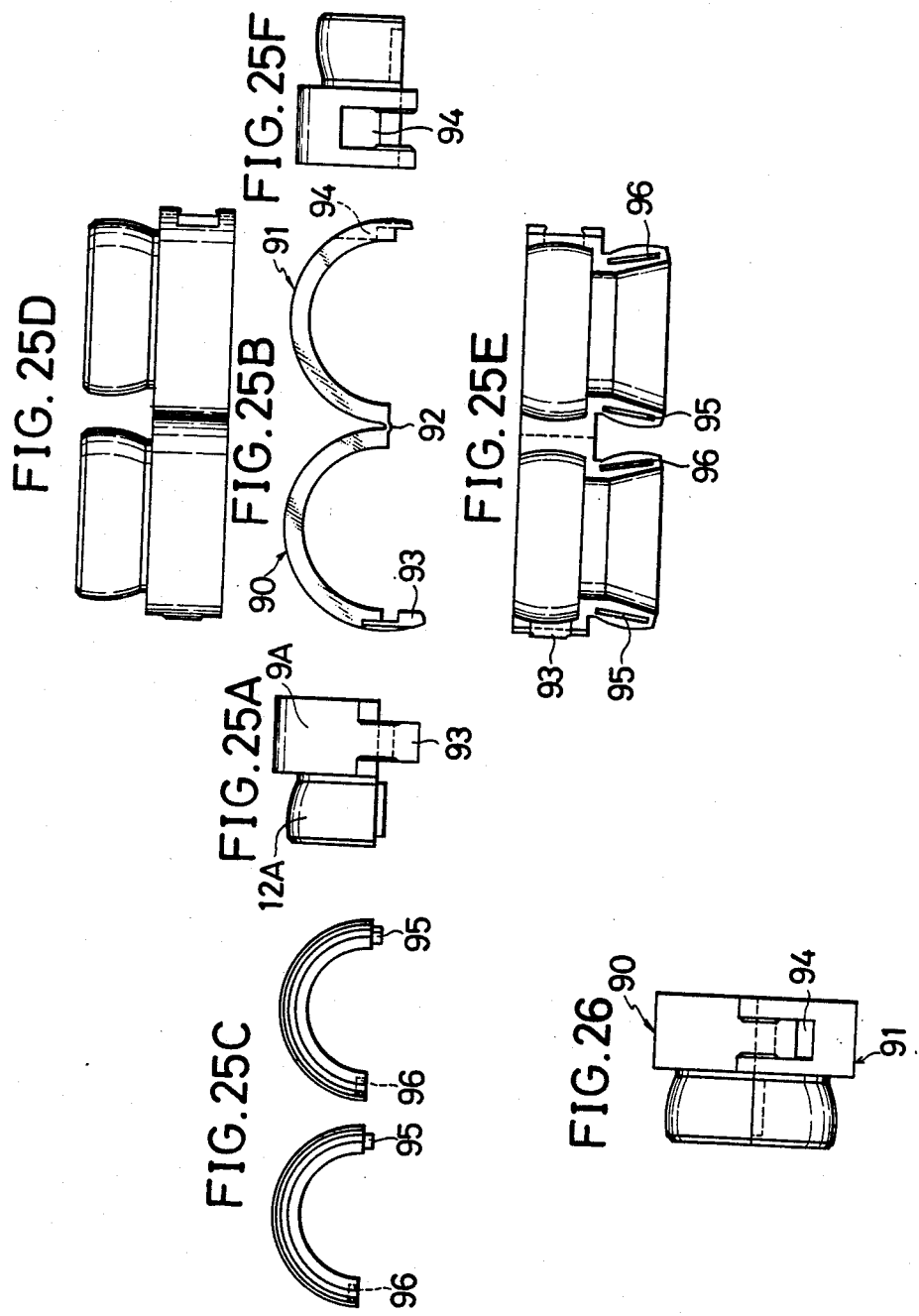

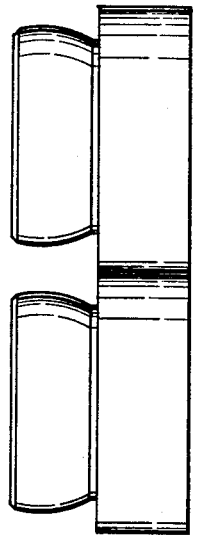
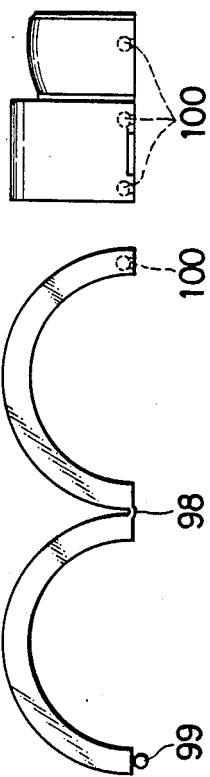
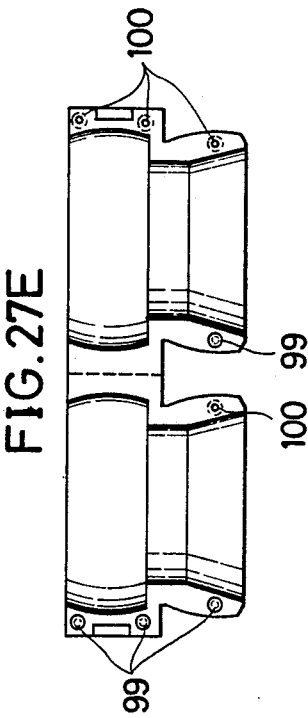
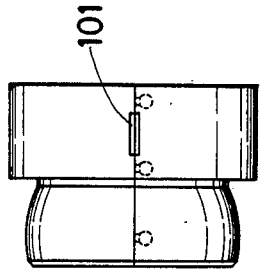
FIG.27A FIG.27B FIG.27C FIG.27D FIG.27E FIG.27F FIG.28

FIG.48
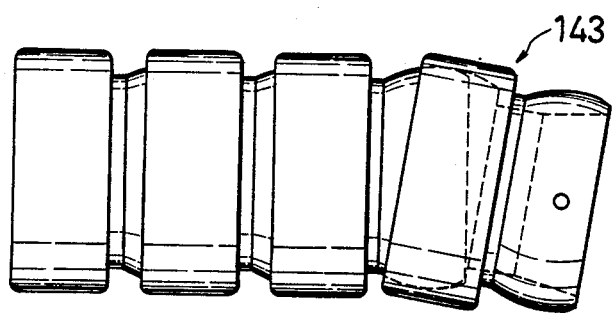
FIG.49C   FIG.49A   FIG.49B
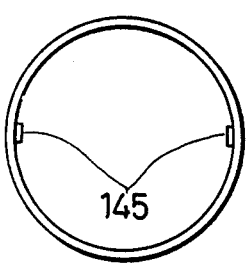 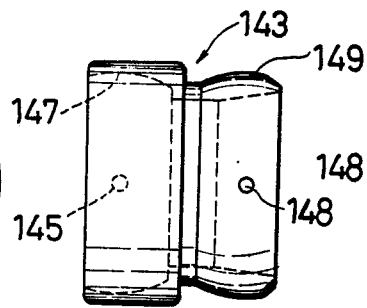 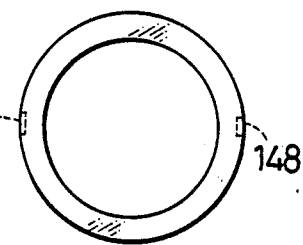

FIG.56
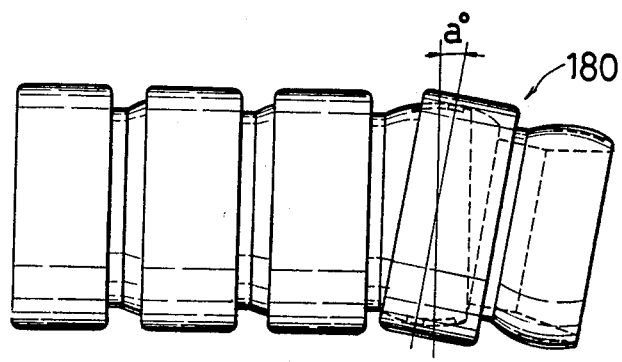
FIG.57C     FIG.57A     FIG.57B
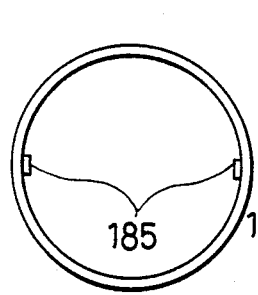 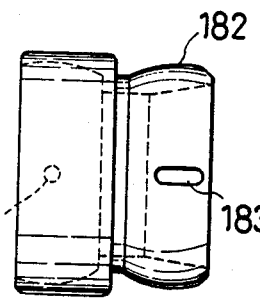 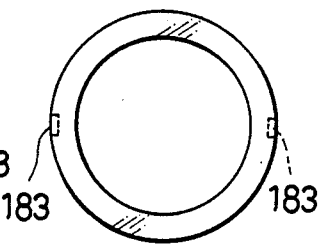

FIG.62D
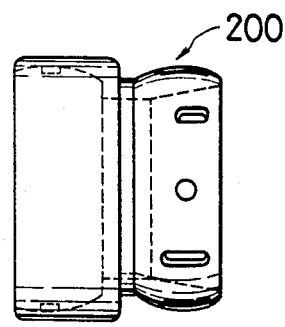
FIG.62C  FIG.62A  FIG.62B
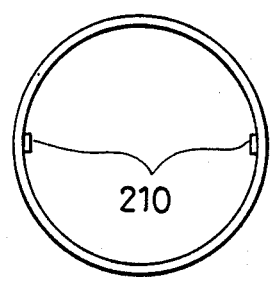 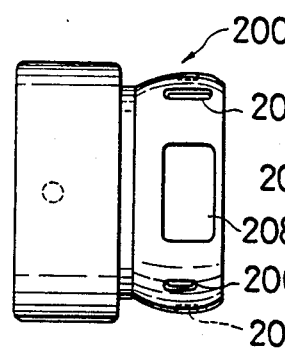 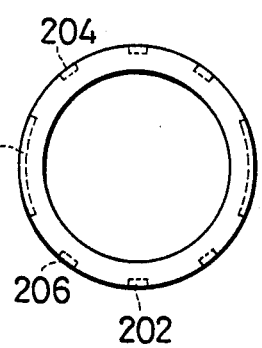
FIG.62E
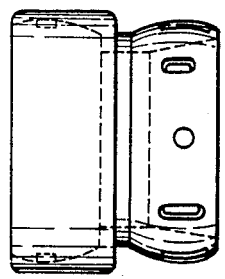

FLEXIBLE SUPPORTING SHEATH FOR CABLES AND THE LIKE

BACKGROUND OF THE INVENTION

This invention relates to a flexible supporting sheath for cables, hoses and the like. It has particular utility where cables, hoses and the like used for feeding electric power, control signals, gas water, oil, etc. are gathered in one or more groups, and supported and guided between moving and fixed parts, or between moving parts, in a robot, or other machine or machine tool.

In the conventional machine tool or the like, a flexible supporting sheath for cable or the like comprises a series of inner frames, adjacent frames being connected by surrounding pieces. The sheath encloses, supports and guides a portion of cable having a fixed end and a moving end, allowing the cable to be flexed repeatedly within a specified range of movement. Each of the frames has two grooves of specified width arranged in uniformly spaced relationship, and the surrounding pieces have flanges which fit into the grooves. Each of the inner frames in the sheath has surrounding pieces at both of its ends so as to make one united assembly.

Bellows-type sheaths have also been used to enclose cables and the like connected between relatively movable machine parts. Bundled cables have also been used to make connections between relatively moving parts.

Although the conventional flexible supporting sheath, comprising frames and surrounding pieces, is capable of bending in a plane, and thus adapted for use with a linearly moving body, it is not suitable for use with a robot capable of universal movement.

In the case of universal or three-dimensional movement, bellows or bundled cables have been used. However, with bundled cables, bunching of the cables may result in aesthetic problems in outer appearance, and furthermore the cables may not be adequately protected. With sheaths of the bellows type it is difficult to cut and make connections. Furthermore, with bellows it is not possible to establish a specific minimum radius of curvature, and adequate strength for supporting the cables cannot ordinarily be attained.

In accordance with the present invention, a flexible supporting sheath for cable and the like is formed by connecting hollow links in an articulating chain characterized by interfitted inner spherical concave surfaces and outer spherical convex surfaces. The links allow the sheath to be bent freely in any direction. The links include stop means for limiting the articulation of joined links beyond a specified angle, thereby establishing a minimum bending radius.

In accordance with the invention, it is also possible to increase the minimum radius of curvature, and even to render portions of a sheath unbendable. This can be accomplished by the use of spacer members inserted between adjoining links whereby bending is prohibited, or partial bending is permitted so that the minimum bending radius is enlarged.

With the conventional supporting sheath consisting of alternated grooved frame elements and flanged connecting pieces, and even with a bellows-type sheath, it was impossible to provide a branch in the midportion of the sheath. Branching is often desirable for making electrical or fluid connections in complex robots or machine tools.

In accordance with the invention, one or more of the links in the flexible sheath has at least three openings. Two of these openings connect respectively to adjacent links in the sheath, while a third opening connects to a branch. The branch can consist of a similar articulated sheath, in which case the third opening may have a spherical fitting surface for connection to a first link of the branch.

Another aspect of the invention relates to preventing the intrusion of water and dust into the interior of the flexible sheath. This invention solves the problems of waterproofing and dust-proofing in a flexible supporting sheath by means of annular seals provided at the engaging parts of the concave and convex spherical surfaces, or by belt seals covering the gaps between adjacent links, or by annular seals which are compressed in these gaps, or by projections formed on the concave or convex spherical surfaces which partially eliminate the gaps between the engaging spherical surfaces.

One problem with a flexible sheath in accordance with the invention is that it is not necessarily easy to connect and disconnect a convex spherical surface and a concave spherical surface. This can be done by application of heat to the concave surface to cause it to expand. However a more effective means of connection and disconnection in accordance with the invention is provided by splitting the links into halves. Each of the halves is provided with two longitudinal faying, or closely meeting, surfaces, and at least one pair of the faying surfaces are engaged to each other by snap-in connection.

To enable a flexible cable supporting sheath to follow a large variety of movements and at the same time stabilize the paths of movement of the sheath, it is frequently necessary to provide a flexible sheath which is fixed at one part thereof, flexible in only one direction with a fixed minimum radius of bend at another part thereof and bendable to a fixed minimum radius in arbitrary directions at still another part thereof. Prior flexible sheaths have been unable to meet such requirements.

This invention satisfies these requirements by a construction in which each of the spherical surfaces is provided with one or more radial holes, and a pin is press fit in hole in one link and loosely fitted in a hole in an adjacent link. The pin may be provided on a spacer which is inserted in a gap between adjacent links. Alternatively, a spacer inserted in the gap between the adjacent links can have tongues extending in the longitudinal direction and engaged with grooves provided in the links to prevent the links from rotating.

Another way to meet the requirements for various motions such as one-dimensional, two-dimensional and three-dimensional motions in accordance with the invention is to provide one of the spherical surfaces of a link with projections while the other is provided with recesses. The projections are engaged with recesses.

By choosing the appropriate configurations for the projections and recesses and, further, by providing the large diameter part on the outside of the concave spherical surface with a stop projecting in the longitudinal direction, it is possible to accommodate one-dimensional, two-dimensional, no-back-bend, three-dimensional and other motions, while increasing the slipping-off load of the links.

The invention has the following objects:

(1) To provide a flexible supporting sheath for cables and the like which can be smoothly bent in any direction, so that it may easily follow the movable parts of robots and other automatic machines.

(2) To accommodate all movements of factory automation equipment designed for unmanned operation in the factory in response to the needs of recent industrial technology, and to make improved utilization of the flexible supporting sheaths for cables and the like.

(3) To provide a closed and dust-proof sheath structure which is resistant to the entry of foreign materials from outside the structure and in which the cables, hose and the like within the sheath are protected in a superior manner.

(4) To conceal the cables, hoses and the like from view and to provide a sheath having an aesthetically pleasing outer appearance.

(5) To provide a flexible supporting sheath having a predetermined minimum bending radius.

(6) To provide a flexible supporting sheath in which internal cables, hoses and the like are stored in a compact form.

(7) To provide a flexible supporting sheath which is light in weight and does not generate sound when used.

(8) To provide a flexible supporting sheath having a minimum number of different component parts so that it can be economically mass-produced.

(9) To provide a flexible supporting sheath in which the links can easily be connected and their assembly can easily be performed, and the length of which can be changed easily by adding or removing links.

(10) To provide for various operating conditions by the choice of thickness, shape, inserting position and the like, of spacers inserted between the links.

(11) To produce a compact installation of the sheath, improve its outer appearance and increases the safety of operation by using spacers between links to restrict the movement of the sheath.

(12) To facilitate adjustment, restrict the movement of, and stabilize the sheath unit while its entire movement is being confirmed, by the insertion or removal of spacers on site.

(13) To make fluid or electrical connections between one stationary or movable part and a plurality of movable parts, or between one movable part and a plurality of stationary or movable parts, while maintaining electrical and fluid conductors in a compact form.

(14) To increase the lateral rigidity of a flexible connection by providing multiple interconnected parallel sheaths.

(15) To accommodate a wide variety of multiple-branch applications by providing links of various shapes such as L-shape, T-shape, Y-shape, cross-shape and others.

(16) To provide additional support for a flexible supporting sheath by utilizing a branched part of the sheath to support part of the sheath by suspending it, for example, from the main body of a machine.

(17) To provide a flexible multiple-link supporting sheath having an improved sealing structure resistant to penetration of cutting coolants, water, oils or the like from the exterior, while maintaining the feature of the flexible sheath that it can be three-dimensionally bent in arbitrary directions.

(18) To make it easy to make connections of a sheath to fixed or movable machine element on site.

(19) To make it possible to remove and replace individual links conveniently in making repairs or adjustments.

(20) To make it easy to make connections of a sheath to fixed or movable machine element on site.

(21) To provide for simpler and more economical manufacture of molded links by utilizing a split link structure, thereby making it easier to eject the link parts from the mold and increasing the useful life of the mold.

(22) To provide for increased slipping-off load in a flexible multiple-link sheath having spherical mating elements, and to make it possible to mold link elements of various different designs economically.

(23) To limit the directions in which the links of a flexible supporting sheath can be articulated by means of insertable pins or specially shaped spacers, thereby insuring stability of the sheath and restricting its path of movement, as required under various operating conditions.

(24) To increase the tensile strength of the sheath by means of inserted pins.

(25) To limit the freedom of movement of articulating links in various ways by means of interengaging pins and slots or grooves so that different sheath characteristics can be achieved by constructing a cable from a series of identical links, or from a series of links some of which are different from the others.

BRIEF DESCRIPTION OF THE DRAWINGS

FIG. 1 is an elevational view showing a conventional flexible supporting sheath for cables and the like;

FIG. 8A is a perspective view showing one form of spacer usable in the embodiment of FIG. 7;

FIG. 8B is a perspective view showing another form of spacer usable in the embodiment of FIG. 7;

FIG. 9 is a schematic view of a sheath connected between two relatively movable machine elements, in which spacers are used to limit articulation of parts of the sheath;

FIG. 13 is an axial section showing details of a further alternative branched sheath;

FIG. 14 is a front elevational view for showing a pair of supporting sheaths extending in parallel and interconnected by branches;

FIGS. 21A–21F are respectively a front elevation, right side elevation, left side elevation, top plan, bottom plan and rear elevation of one half of an axially split link consisting of two identical parts;

FIG. 22 is a front elevation showing, in assembled condition, a link consisting of two of the halves as shown in FIGS. 21A-21F;

FIGS. 23A-23F are respectively a front elevation, right side elevation, left side elevation, top plan, bottom plan and rear elevation of one half of an alternative axially split link consisting of two identical parts;

FIG. 24 is a front elevation showing, in assembled condition, a link consisting of two of the halves as shown in FIGS. 23A-23F;

FIGS. 25A-25F are respectively a front elevation, right side elevation, left side elevation, top plan, bottom plan and rear elevation of an axially split link consisting of two parts connected by a hinge;

FIG. 26 is a front elevation showing the split link of FIGS. 25A-25F in assembled condition;

FIGS. 27A-27F are respectively a front elevation, right side elevation, left side elevation, top plan, bottom plan and rear elevation of an alternative axially split link consisting of two parts connected by a hinge;

FIG. 28 is a front elevation showing the split link of FIGS. 27A-27F in assembled condition;

FIG. 35 is an axial section through the sheath of FIG. 34;

FIG. 48 is an elevational view of a sheath in accordance with the invention in which the convex spherical link surfaces are provided with recesses, while the concave spherical surfaces have projections;

FIGS. 49A, 49B and 49C are respectively front, right side and left side elevational views of a link from the sheath of FIG. 48;

FIG. 56 is an elevational view of a sheath in accordance with the invention in which the concave spherical surfaces have inward projections, and in which the convex spherical surfaces have elongated articulation limiting slots;

FIGS. 57A, 57B and 57C are respectively front, right side and left side elevational views of a link from the sheath of FIG. 56;

FIGS. 62A, 62B, 62C, 62D and 62E are respectively front, right side and left side elevations, and top and bottom plan views of a link in which the concave spherical surface has opposed inward projections, and in which the convex spherical surface has a plurality of alternatively usable recesses of different shapes;

DETAILED DESCRIPTION

Figure 1:
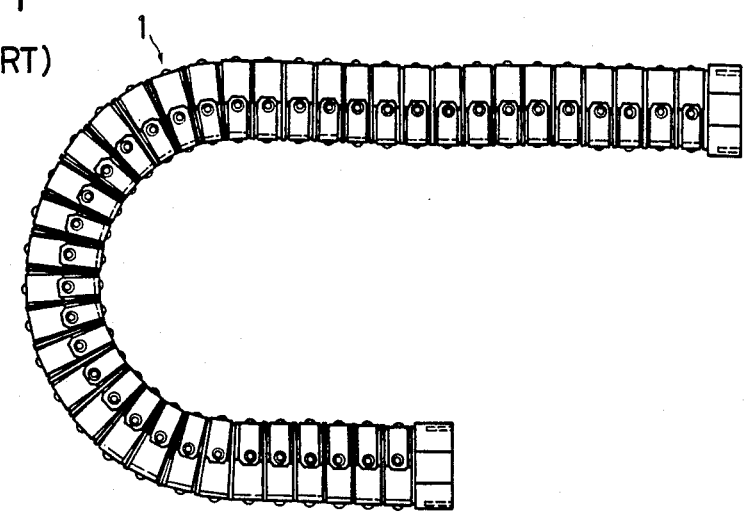
Figure 2:
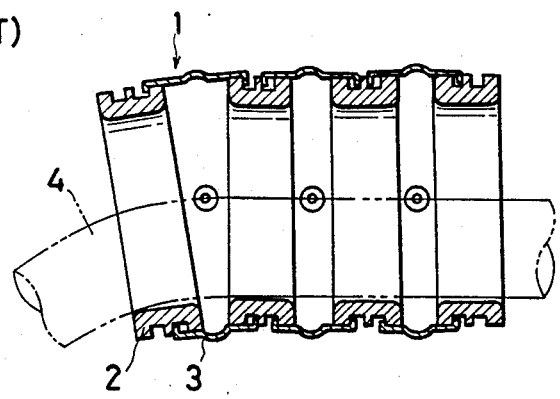
FIG. 2 is an axial section through a part of the sheath of FIG. 1.

The conventional flexible supporting sheath, as shown in FIGS. 1 and 2, comprises a series of hollow inner frames 2, adjacent frames being connected by surrounding pieces 3. The sheath encloses, supports and guides a cable 4 having a fixed end and a moving end, allowing the cable to be flexed repeatedly within a specified range of movement. Each of frames 2 has two grooves of specified width arranged in uniformly spaced relationship. The surrounding pieces 3 have flanges which fit into the grooves. Each of the inner frames in the sheath has surrounding pieces at both of its ends so as to make one united assembly. Coupling elements are connected to the surrounding pieces at the ends of the sheath for connecting the ends of the sheath to relatively movable machine parts.

Figure 3:
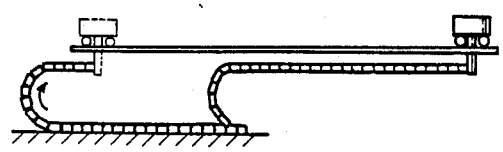
FIG. 3 is a schematic view showing a typical application of the flexible supporting sheath of FIG. 1.

The conventional flexible supporting sheath of FIGS. 1 and 2 is capable of bending in a plane, and thus adapted for use with a linearly moving body as in FIG. 3. It is not suitable for use, however, with a robot capable of universal movement.

The sheath of the present invention is characterized by interfitted inner spherical concave surfaces and outer spherical convex surfaces. Various provisions may be made in accordance with the invention for restricting articulation of the links. However, unless such restricting provisions are present, the links allow the sheath to be bent freely in any direction within a limited range. The links themselves include stop means for limiting the articulation of joined links beyond a specified angle, thereby establishing a minimum bending radius.

When one of the links reaches a bending limit relative to an adjacent link, a next link in the series bends in sequence, resulting in the formation of a specified bending radius. Since each of the links in the series can be bent in any direction, the sheath may be bent in a three dimensional pattern while the specified bending radius is maintained.

A spacer may be inserted into spacers between the links of the sheath where bending is not required.

Figure 4:
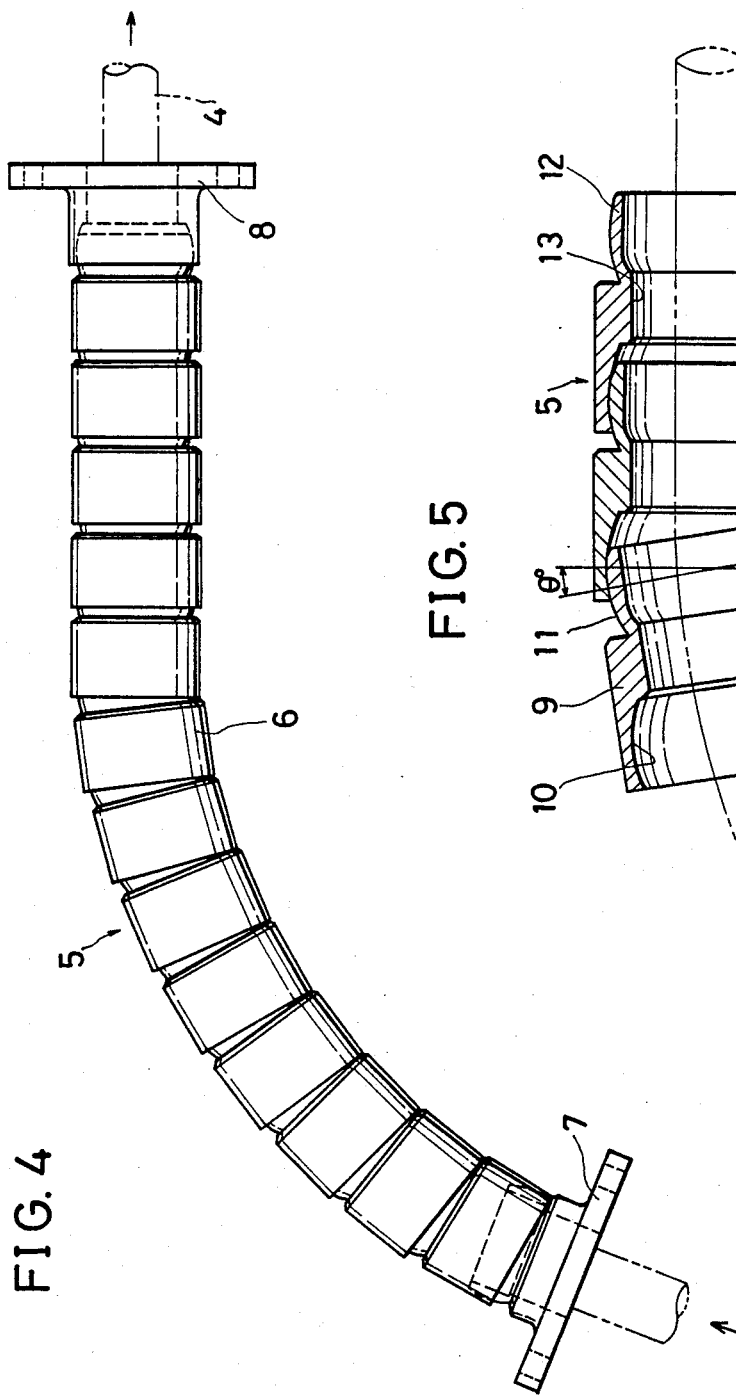
FIG. 4 is an elevational view showing a first embodiment of the invention.
Figure 5:
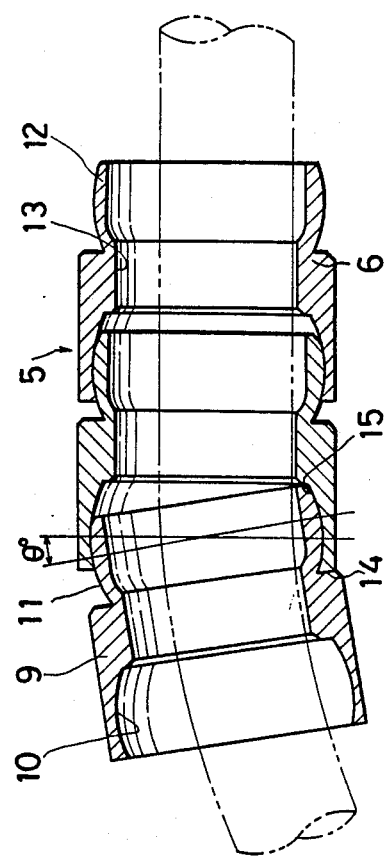
FIG. 5 is an axial section through part of the sheath of FIG. 4.

In FIGS. 4 and 5 a flexible supporting sheath 5 comprises a series of interfitted hollow links 6, having spherical convex and concave surfaces and their right and left ends respectively. The ends of the supporting sheath 5 are provided respectively with flanged couplings 7 and 8. Coupling 7 has a spherical convex surface, while flange 8 has a spherical concave surface.

Link 6 has an offset shape in which an inner spherical concave surface 10 is formed within a cylinder 9 at its large diameter end, and in which a projection 12 of smaller diameter has an outer spherical convex surface 11. The link has a longitudinal cylinderical hole 13 having a smaller diameter than that of each of said spherical surfaces. Each of the links is inserted into an adjoining link by engagement of their spherical concave and convex surfaces. Each of the links is fitted to its adjoining link so that they can articulate smoothly through an angle $\theta$ from aligned relationship with an adjoining link. When one link is rotated though an angle $\theta$ from an aligned relationship with an adjacent link, contact takes place at surface 14 or at surface 15. These surfaces serve as stop surfaces to limit articulation of adjoining links to a maximum angle $\theta$.

The inner surfaces of links 6 are finished smoothly so as not to damage the cable 4, hose or the like extending through the sheath. For the same reason the corners capable of contacting the cable are chamfered. As the relatively movable machine elements connected by the sheath are moved, and each link 6 is rotated through an angle $\theta$, the adjoining link 6 is rotated in sequence. The sheath therefore bends to a specified bending radius. Since each of the links 6 can be rotated through an angle $\theta$ in any direction at its spherical surface, it is possible to bend the sheath in a three-dimensional manner while maintaining a specified bending radius.

One way to connect the links to each other is by thermal expansion. To connect links 6 to each other, their spherical concave surfaces are immersed in water at a temperature preferably from 70° C. to 100° C. to produce a local expansion of the diameter of the concave surface. The spherical convex part of the adjoining link is then inserted into the concave part and the concave part is allowed to contract.

Figure 6:
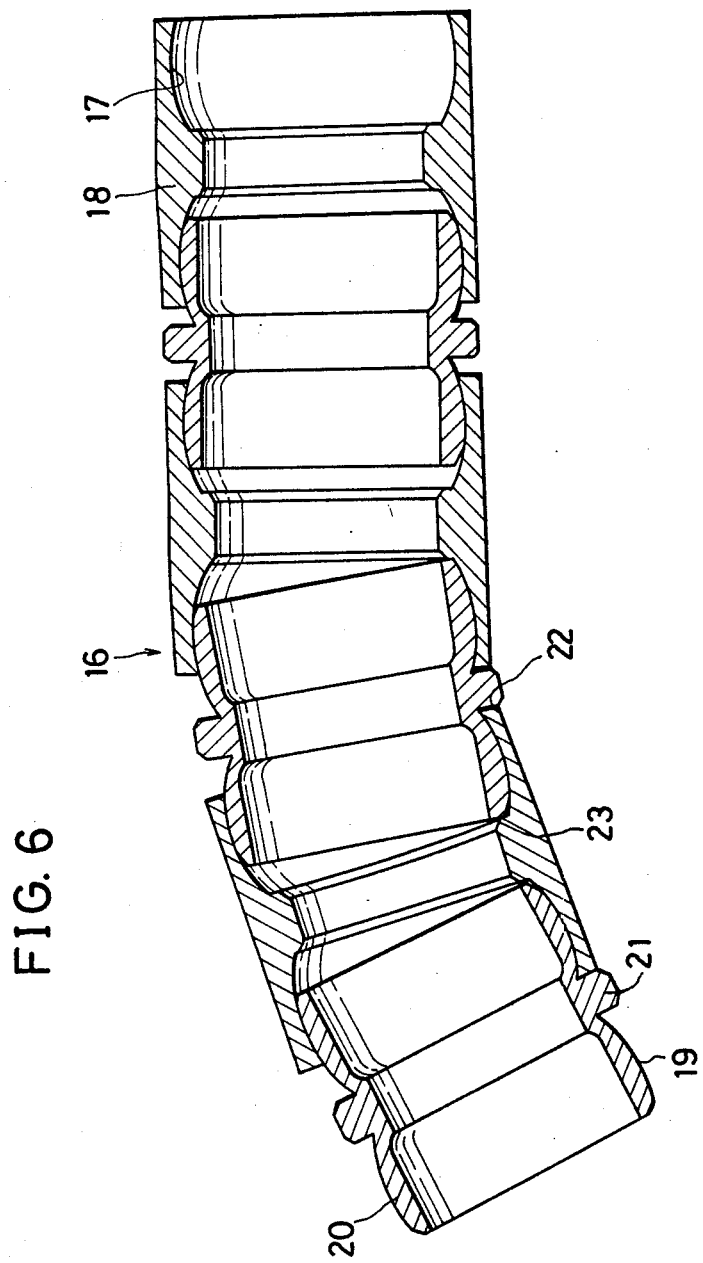
FIG. 6 is an axial section showing a second embodiment of the invention.

In the second embodiment of the invention, as shown in FIG. 6, a flexible supporting sheath 16 comprises articulating links, each link comprising a pair of outer and inner link elements. Hollow outer link elements 18, having inner spherical concave surfaces 17 at both ends, and hollow inner link elements 20, having spherical convex surface 19 at both ends are connected alternately. The inner link element 20 has a central ring-like projection 21, serving as a stop for limiting a rotation of the right and left adjoining outer link elements 18 to a specified angle. The convex and concave surfaces are fitted to each other so that, when the flexible supporting sheath 16 is bent, each of the link elements articulates smoothly relative to its adjoining link elements. When the link element is rotated through a specified angle relative to an adjacent link element, contact takes place at surface 22, or at surface 23, or at both surfaces, to limit articulation of the link elements. The inner cylindrical surfaces of the inner link element 20 and of the outer link element 18 are finished smoothly and corners capable of contacting the cable are chamfered so as not to cause damage to the cable.

Figure 7:
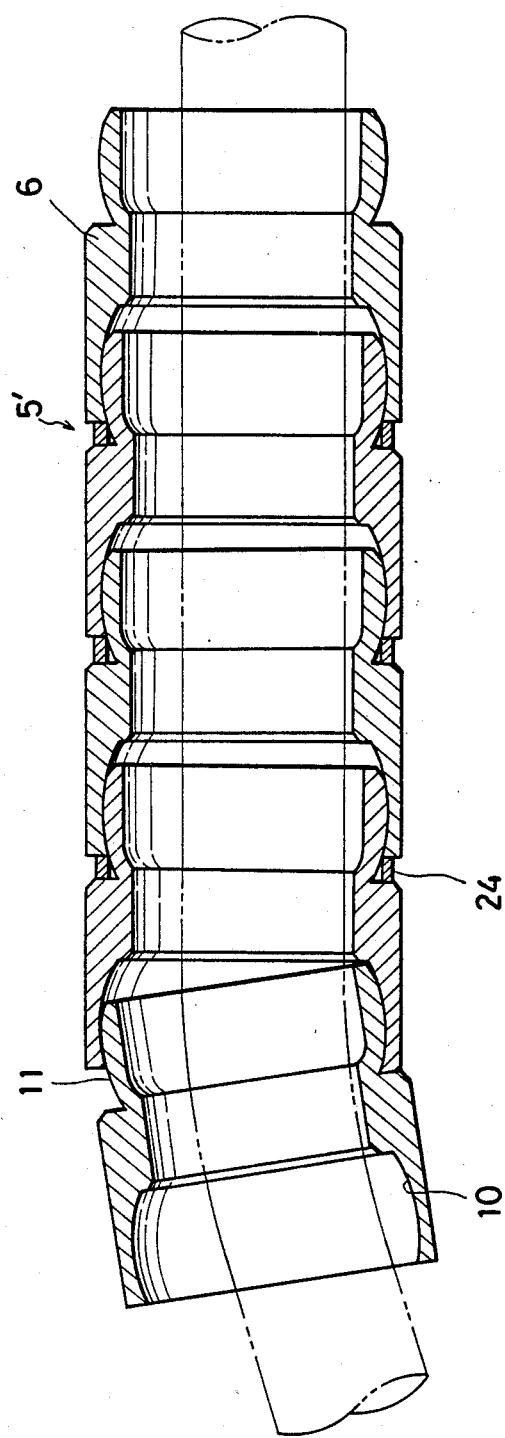
FIG. 7 is an axial section showing a third embodiment of the invention in which spacers are used to limit articulation of the links of the sheath.

In FIG. 7 a ring-like spacer 24 is inserted into a flexible supporting sheath 5' and the like comprising a series of interconnected offset-type links.

When it is desired to prohibit the bending of the flexible sheath 5', a specer 25 as shown in FIG. 8 is inserted into the end part of the spherical convex surface 11 of the link 6. Of course, the inserting point may be an end part of the spherical concave surface 10 of the adjoining link 6.

When it is desired to modify the bending radius of the flexible supporting means 5' of the perferred embodiment, an appropriate thickness for spacer 25 is selected, or only one spacer is inserted for every several links. Further, when it is desired to maintain and fix a specified bending radius, a tapered spacer 26 as shown in FIG. 8B may be used.

FIG. 9 shows a sheath in which spacers are inserted at portion 29 of the sheath near the fixed machine part 27 and at portion 30 of the sheath near the moving part 28 of the machine. Only the central part 31 of the sheath bends. The moving machine part 28 can move in any direction. The flexible supoorting sheath 5' is partially restricted against bending both ends. This limits the bending of the sheath, and is one way to prevent reverse bending.

Figure 10:
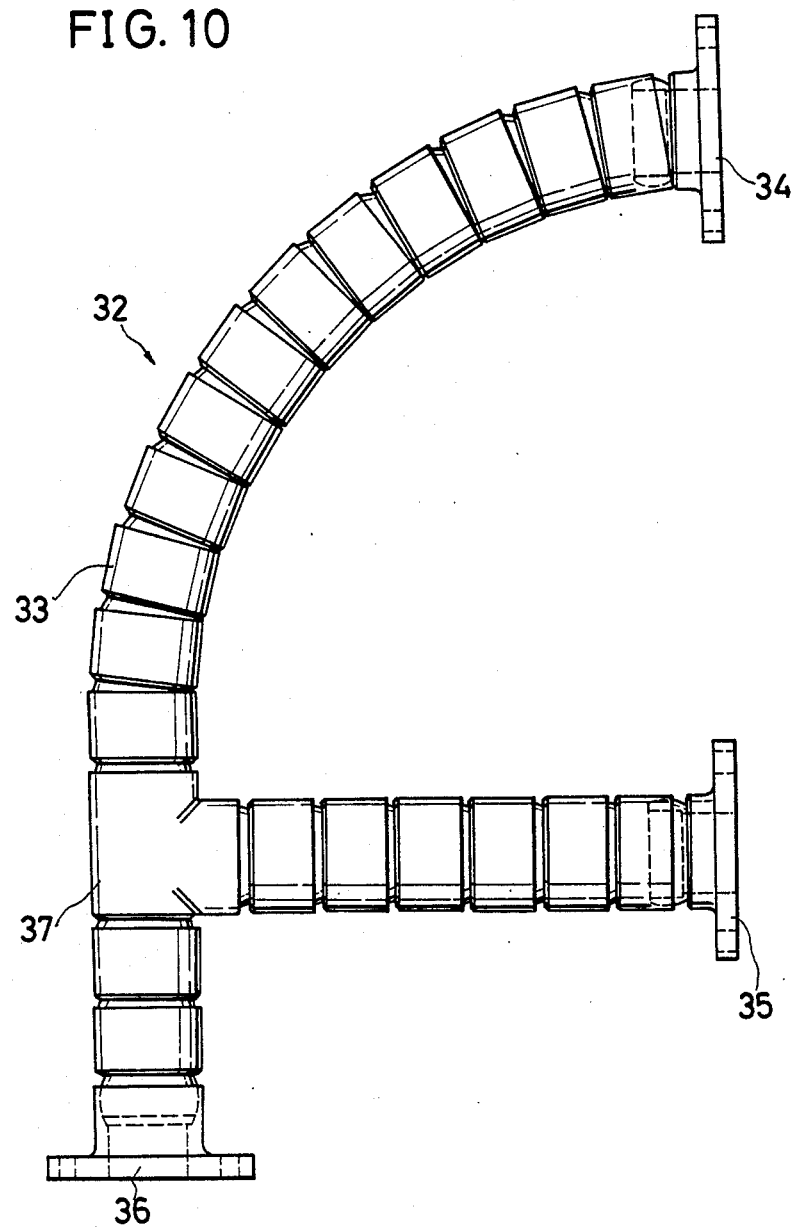
FIG. 10 is an elevational view showing an embodiment of the invention in which the sheath is branched.
Figure 11:
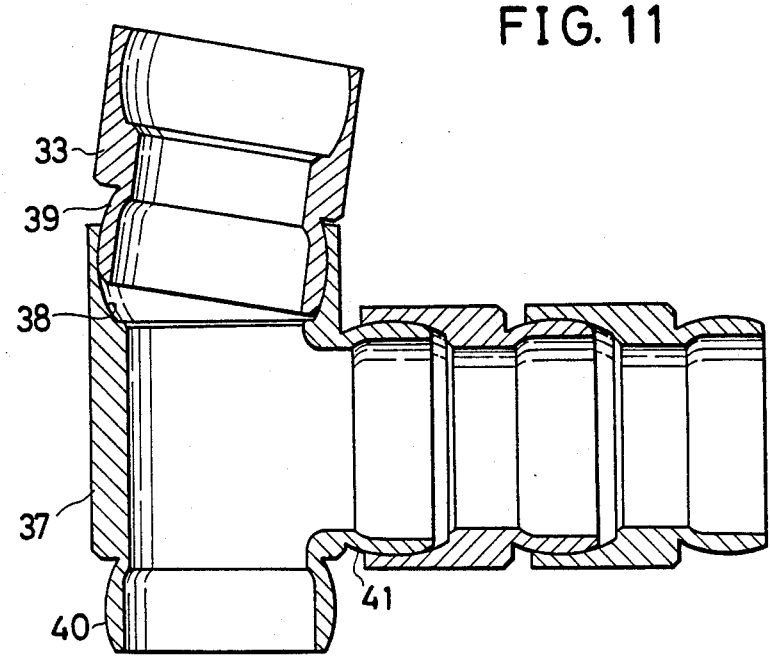
FIG. 11 is an axial section showing details of the branching link of FIG. 10.

The embodiment of the invention shown in FIGS. 10 and 11 comprises a branched sheath 32. The sheath, for the most part, comprises conventional links 33 similar to those depicted in FIGS. 4 and 5. Flanged couplings 34 and 35 are similar to coupling 8 in FIG. 4. Flanged coupling 36 is similar to coupling 7 in FIG. 4. A T-shaped link 37, inserted along the main section of the sheath, allows the connection of a branch to an intermediate location on the main section.

The T-shaped link 37, as shown in FIG. 11, has three openings, one having a spherical concave surface, and the other two having spherical convex surfaces. The concave surface 38 fits the convex surface 39 of adjoining link 33 in such a way as to allow articulation of links 33 and 37 in the same manner as described with reference to FIGS. 4 and 5. Convex surfaces 40 and 41 fit concave surfaces of links of main sheath section and branch respectively.

The flexible supporting sheath of this embodiment can be branched at any location by means of the T-shaped link 37, and at the same time it may be bent in any direction.

Figure 12:
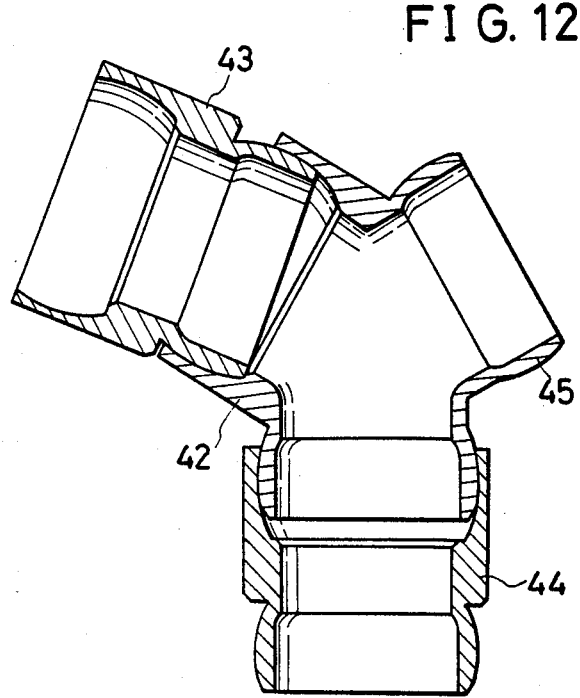
FIG. 12 is an axial section showing details of an alternative branched sheath.

FIG. 12 shows an embodiment of the present invention which has a divisible Y-shaped link 42 connected to links 43 and 44 of a main sheath section. A branch can be connected to convex spherical part 45.

FIG. 13 shows an embodiment of the invention which has a multi-directed branch link 46 connectable to a large diameter link 47 and to several smaller diameter links 48, 49 and 50, each of which is a first link in a separate branch.

Figure 15:
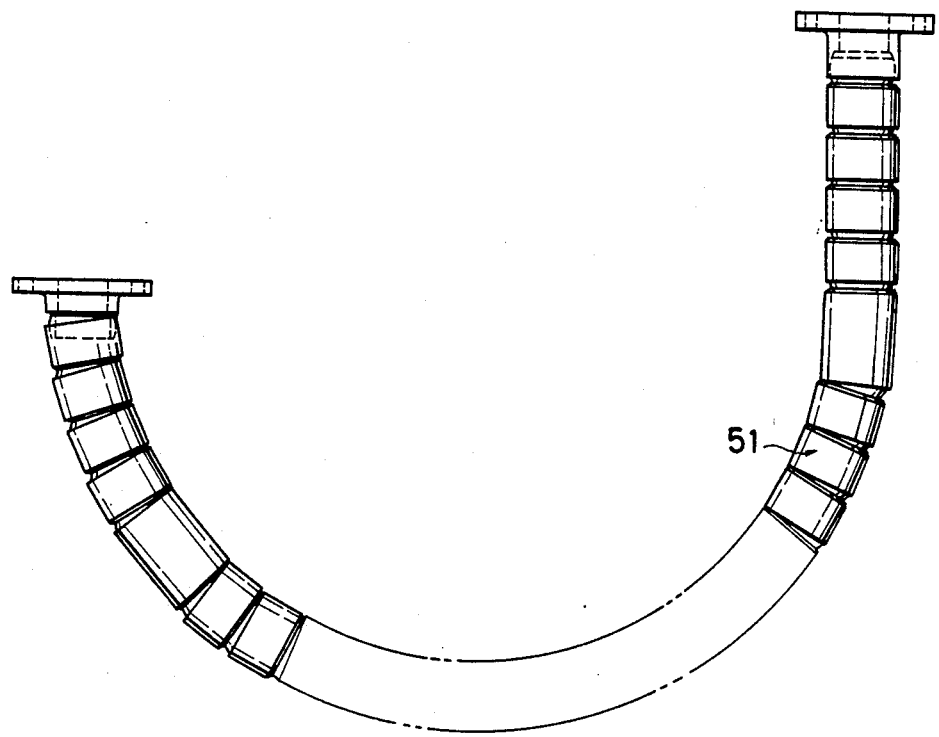
FIG. 15 is a side elevation of the sheaths of FIG. 14.

FIGS. 14 and 15 show an embodiment of the invention in which two parallel sheaths 51 and 52 are interconnected at flexible supporting means for cable and the like to have one or more locations by means of T or L-shaped links 53 and 54.

The links of the sheath may be provided with one or more of a plurality of alternative sealing structures as depicted in FIGS. 16-20.

Figure 16:
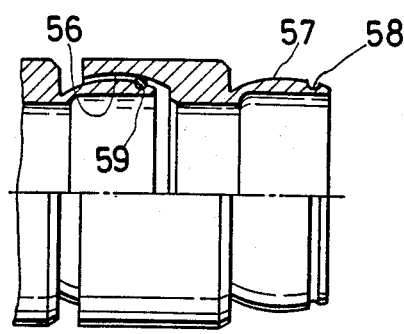
FIGS. 16 through 20 are fragmentary side elevations, partly in section, showing several alternative forms of seals for the interconnected spherical surfaces of links in accordance with the invention.

FIG. 16 shows a sealing structure wherein, of a concave spherical surface 56 and a convex spherical surface 57, the convex spherical surface is provided with a groove 58, in which an annular O-ring seal 59 is placed.

Figure 17:
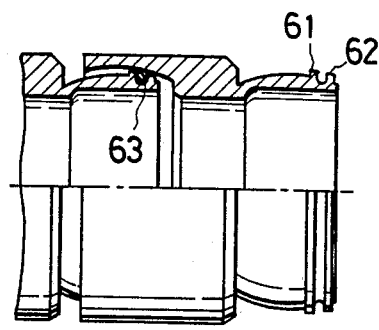

FIG. 17 shows a sealing structure which is similar to that shown in FIG. 16 except that projecting ribs 61 and 62 are provided on both sides of the annular seal 63 to prevent the seal 63 from slipping off the spherical surface when the links are articulated. In addition, a waterproofing effect is achieved by the projecting ribs.

Figure 18:
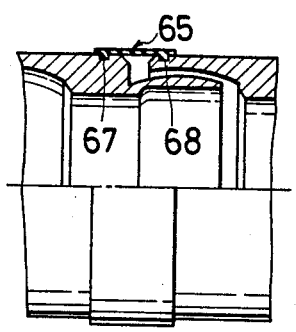

FIG. 18 shows a sealing structure in which a flexible belt seal 65 is externally fitted to the gap formed between the links thereby providing a waterproofing effect. The belt is provided with ribs 67 and 68, which fit into grooves formed in the outer surface of the links.

Figure 19:
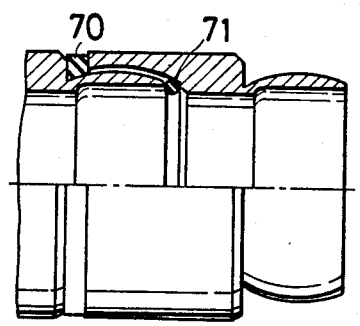

Next, FIG. 19 shows a sealing structure in which flexible annular seals 70 and 71 are fitted respectively into the outer and inner gaps formed between the links in the axial direction, resulting in a waterproof structure. These annular seals can be used together or alternatively. They are inserted at the time the links are connected together. If the seal is compressed when it is installed, a sealing effect can be achieved even when the sheath is articulated, provided that the degree of bending of the links is not too great.

Figure 20:
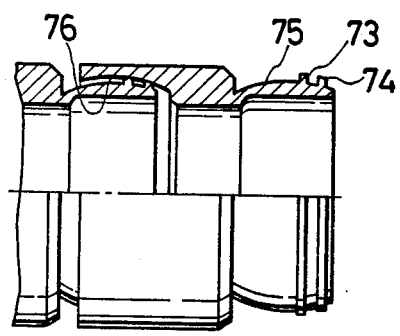

Finally, FIG. 20 shows a sealing structure not using flexible seals, in which annular rib-like projections 73 and 74 are provided on the convex spherical surface 75 and are closely fitted to the concave spherical surface 76, thereby reducing the area of contact of the concave and convex spherical surfaces to permit smooth articulation while achieving a waterproof structure. In this case, the gap is set to be substantially zero. A close fit is insured, preventing penetration of water or the like from the exterior. The annular projections instead of being on the convex spherical surface, may be provided on the concave spherical surface 76.

The shapes of the links shown in FIGS. 16-20 are merely specified examples, and a variety of modifications can be made, as described with reference to the other embodiments mentioned above.

The need for immersion of the concave parts of the links in hot water during assembly can be avoided by the adoption of one of the structures depicted in FIGS. 21A-28.

First, FIGS. 21A-E and 22 illustrate a link consisting of two identical halves 78 and 78'.

The half link 78 has longitudinal faying surfaces 80 and 81 seen in FIG. 21E. For engagement of the larger diameter parts, faying surface 80 has a tongue 82 projecting in the circumferential direction, while surface 81 has a recessed groove 83 to engage with the tongue of a mating half link. On the small diameter part, surface 80 has a projection 84, while surface 81 has a recessed groove 85. Two half links are arranged to face each other, and snapped together, as shown in FIG. 22. FIG. 22 shows tongue 82 fitting into recessed groove 83'.

The coupled half links can be easily disconnected by inserting the tip of a screwdriver into a groove 83', disconnecting tongue 82 from groove 83', and forcing the links apart.

FIGS. 23A-E and 24 show another example of identical link halves which snap together.

In this example, snap-in type connection is accomplished by ball-like projections 86 and holes 87. In other respects, the structure of the link is the same as that in FIGS. 21A-E. Disconnection of the coupled half links is effected by inserting a screwdriver in a groove 88 and turning to force the links apart.

The couplings 7 and 8 in FIG. 4 can be embodied in split form, all their halves can be connected together by balls and holes in a manner similar to what is depicted in FIG. 24.

Next, FIGS. 25A-E and 26 show a unitary link formed by integrally molding two half links similar to those shown in FIGS. 21A-E and 22.

In this structure, the half links 90 and 91, as shown in FIG. 25B, are connected by a bendable, integrally molded, thin wall hinge 92. The large diameter part of the half link 90 has a tongue 93 while half link 91 has only a recessed groove 94. The small diameter parts have engageable tongues 95 and grooves 96 similar to those in FIGS. 21C and 21E.

FIGS. 27A-E and 28 show a link structure in which two half links are integrally molded together through a thin wall hinge 98. The faying surfaces are engaged to each other through projections 99 and holes 100 in the same manner as in FIG. 24. Again, a slot 101 is provided for insertion of a screwdriver or similar prying tool to disconnect the two link halves.

The specific shapes of the links shown above are mere examples, and modifications can be made, for example as shown in the other examples. Various alternative snap connections can be used.

Figure 29:
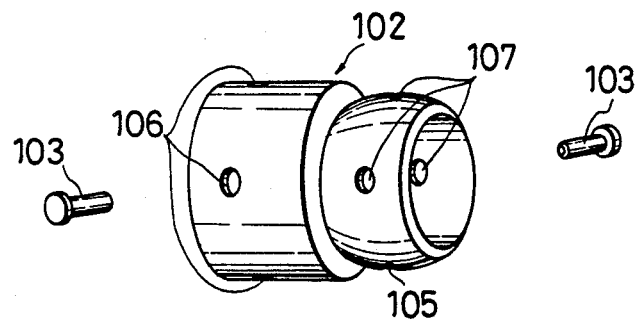
FIG. 29 is an exploded perspective view of an alternative form of link element in accordance with the invention having articulation restraining pins cooperating with transverse holes bored through the spherical mating surfaces of the link element.

FIG. 29 shows a link element 102 and pins 103 for interconnecting the links. Link element 102 has an inner concave spherical surface 104 (FIG. 31) on one end and an outer convex spherical surface 105 on the other end. Radial holes 106 and 107 are arranged symmetrically in vertical and horizontal directions intersecting the centerline of the link. There may be more or fewer of such holes, but in the case shown, there are four holes in the convex part of the link and four holes in the concave part.

Figure 30:
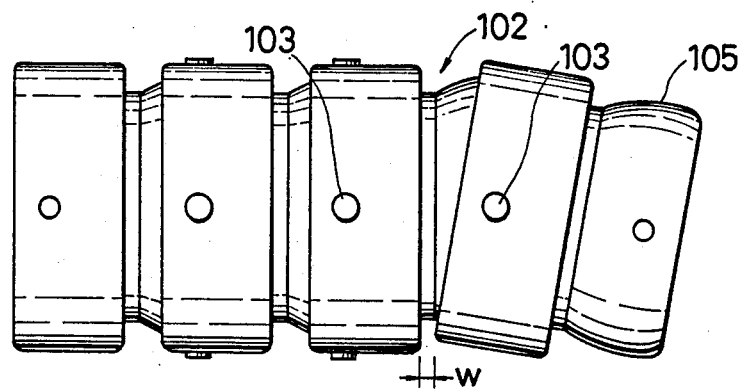
FIG. 30 is a side elevation of a portion of a sheath made up of links of the type shown in FIG. 29.
Figure 31:
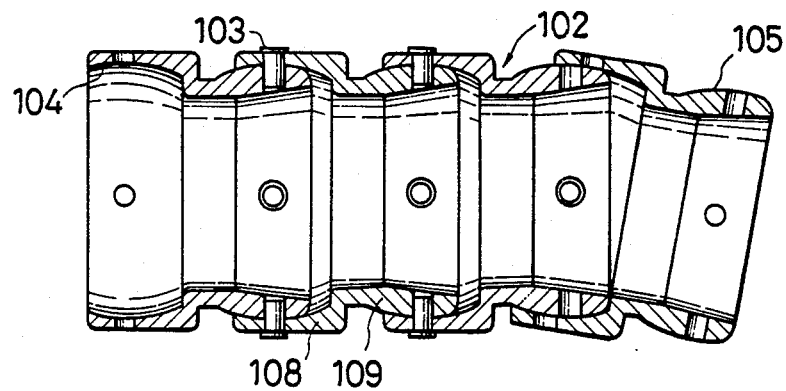
FIG. 31 is an axial section through the sheath of FIG. 30.

FIGS. 30 and 31 show the condition wherein the pins 103 are inserted into interconnected links 102.

The pins 103 are press fit tightly in the holes of the larger diameter parts 108 of the links and fit loosely in holes in the smaller diameter part 109.

The lengths of the pins 103 are such that the pins do not protrude from the inside surfaces of the smaller diameter parts 109.

When the pins 103 are engaged with an adjacent pair of links at all four locations, the links 103 cannot be articulated and are self-supporting.

When the pins 103 are engaged with an adjacent pair of links at two symmetrically opposed locations, the links can be articulated in only one direction, so that a flexible sheath capable of two-dimensional movement is realized. In this case, since the pins are located on the bending axis, smooth articulation takes place. The tensile load of the links is also increased. Of course, the joint is flexible in all directions where no pin 103 is inserted. Using links with holes as shown in FIG. 29, a given sheath can be constructed with a wide variety of bending charateristics by an appropriate choice of pins.

The links may be configured with stop surfaces so that a gap w as shown in FIG. 2 remains even when the adjacent links are bent to the maximum degree. This way the possible nipping of a finger, or damaging a machine part, tool or the like by pinching, can be avoided.

Figure 32:
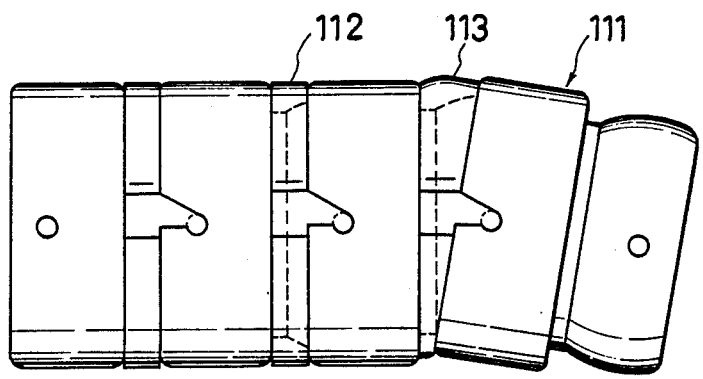
FIG. 32 is a side elevation of a sheath in accordance with the invention having articulation restraining spacers.
Figure 33:
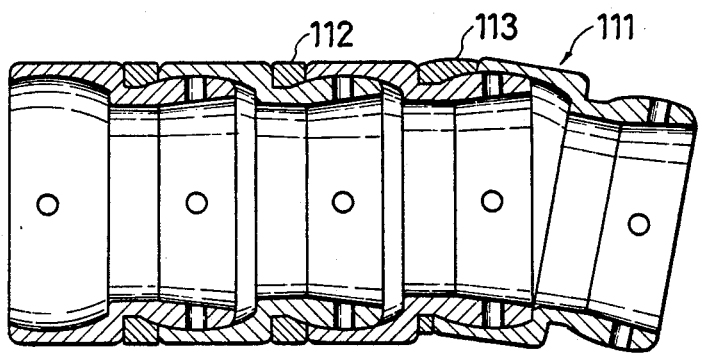
FIG. 33 is an axial section through the sheath of FIG. 32.
Figure 36:
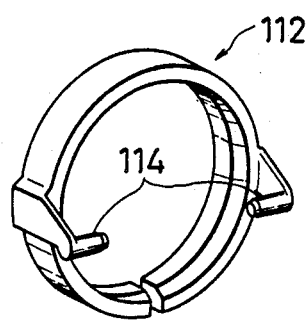
FIG. 36 is a perspective view of one form of articulation restraining spacer.

FIGS. 32 and 33 show a sheath wherein the links 111 have arcuate spacers 112 and 113. As shown in FIG. 36 spacer 112 has a gap in its circumference, and has arms with opposed inwardly extending pins 114. These pins extend into radial holes in the mating spherical parts and help to hold the links together.

The spacer 112 is for use in the case where the links are to be secured together in a line.

The spacer 113 is a tapered link for use in the case where links are to be secured together at a fixed radius of curvature.

Figure 34:
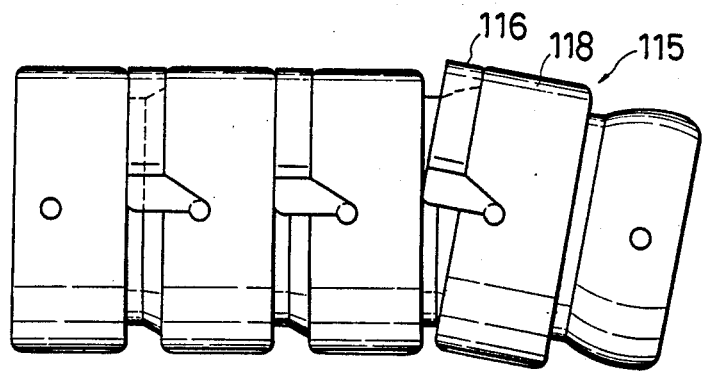
Figure 35:
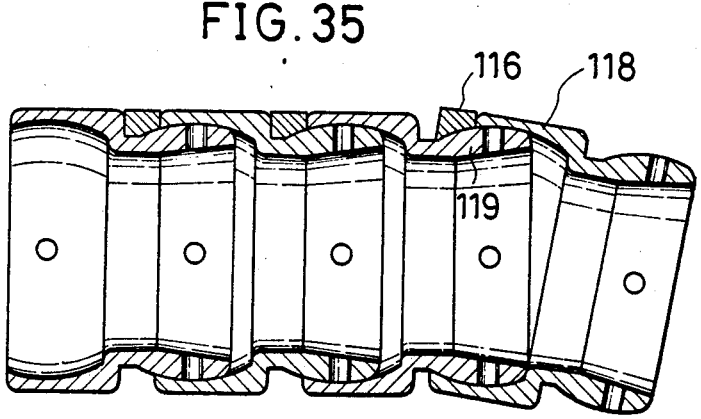
FIG. 35 is a side elevation of a section of sheath in accordance with the invention using another form of articulation restraining spacer.
Figure 37:
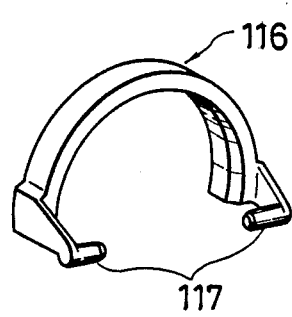
FIG. 37 is a perspective view of another form of articulation restraining spacer.

FIGS. 34 and 35 show links 115 having spacers 116 semi-arcuate in shape and having opposed inwardly extending pins 117, a perspective view of the spacer 35 being shown in FIG. 37.

With the spacers 35 inserted, a flexible support incapable of reverse bending is achieved. That is, the links can be bent in one direction but not in the opposite direction.

Since the pins 117 are inserted in the holes of the larger diameter part 118 as shown in FIG. 34 the spacer 116 moves together with the link and along the spherical outer surface of a small diameter part 119 when the links are bent.

The spacer of FIG. 37 has both a stopping function and a pin function, can be easily inserted into the link, and can be set at any chosen location along a sheath where the reinforcing property of the pins or the restricting property of the spacer is desired. The spacer 116 is loosely fitted to the outer spherical surface of the small diameter part and the adjacent links are interconnected by pins 117, so that the strength of the flexible sheath is increased.

When the width of the spacers shown in FIGS. 36 and 37 is varied or the spacers are tapered, structures capable of maintaining various radii of bending can be obtained.

Figure 38:
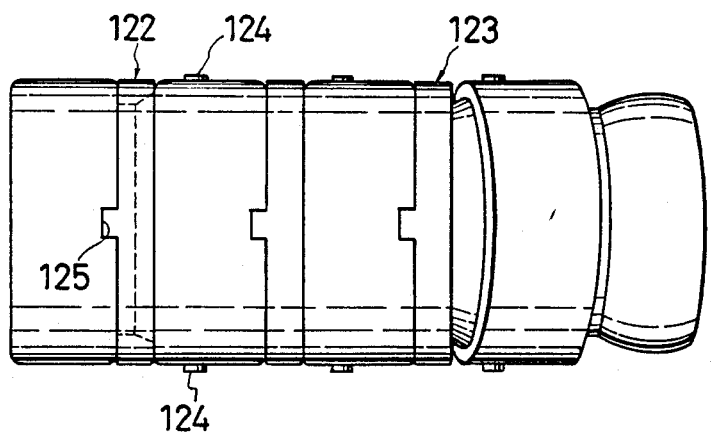
FIG. 38 is a top plan view of a sheath in accordance with the invention having still another form of articulation restraining spacer.
Figure 39:
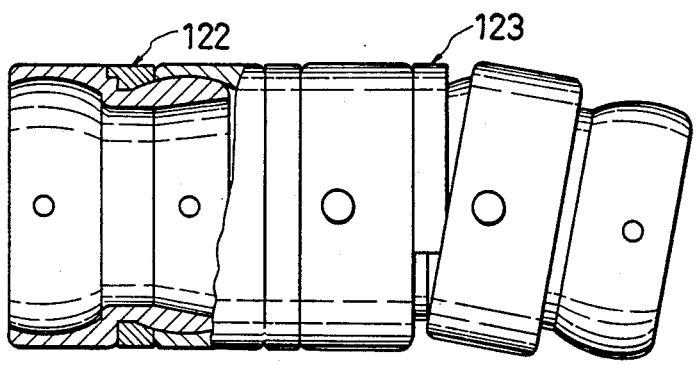
FIG. 39 is a front elevation, partly in section, of the sheath of FIG. 38.
Figure 40:
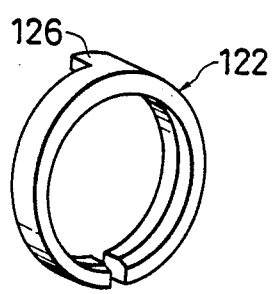
FIG. 40 is a perspective of one form of articulation restraining spacer, as used in the sheath of FIGS. 38 and 39.
Figure 41:
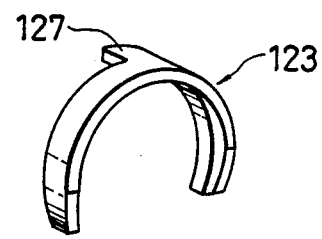
FIG. 41 is a perspective view of another form of articulation restraining spacer as used in FIGS. 38 and 39.
Figure 42:
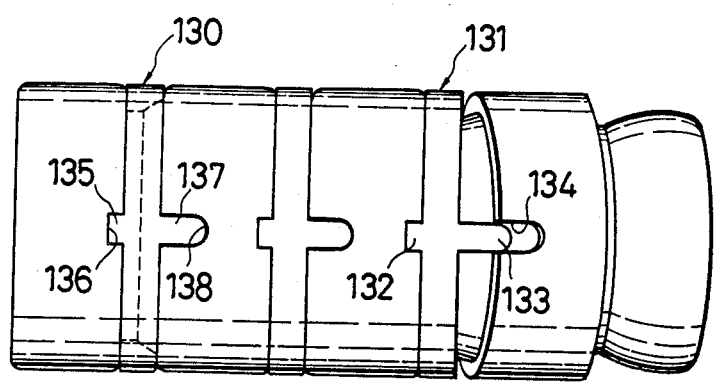
FIG. 42 is a top plan view of another sheath in accordance with the invention having articulation restraining spacers.
Figure 43:
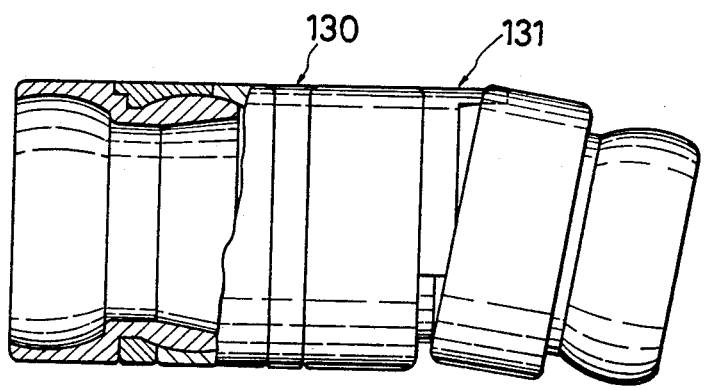
FIG. 43 is a side elevation, partly in section, showing the sheath of FIG. 42.
Figure 44:
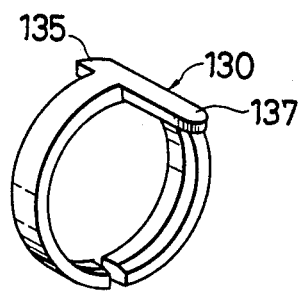
FIG. 44 is a perspective view of one form of articulation restraining spacer as used in the sheath of FIGS. 42 and 43.
Figure 45:
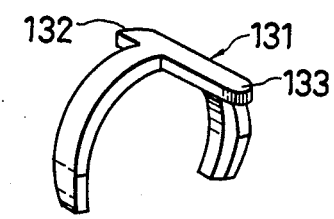
FIG. 45 is a perspective view of another form of articulation restraining spacer as used in the sheath of FIGS. 42 and 43.

In FIGS. 38 and 39 spacers 122 and 123 shown in FIGS. 40 and 41 are engaged, respectively in a sheath. Pins 124 shown in FIG. 38 are engaged on both sides of each link, and the link element is provided in its outside surface with one or more grooves 125 into which a tongue 126 or 127, provided on the spacer, is press fit and fastened. Each of the spacers 122 and 123 is provided on its one side with the tongue conforming to groove 125, and is fastened by press fitting or snap connection of the tongue and the link element.

Although in the above description pins 124 are required in the case of two-dimenional bending, pins 124 may be omitted where other means for preventing relative rotation of the adjacent links is provided. Such a means is shown in FIGS. 42 to 45.

Spacers 130 and 131 are each provided with tongues on both sides of the circumference thereof. In the case of spacer 130, tongue 135 engages a groove 136 while tongue 137 engages a groove 138. The spacer holds the two adjacent links against articulation, while the tongues prevent relative rotation of the links about the axis of the sheath.

Tongue 132 of spacer 131 is tightly fitted (e.g. snap-connected) to the link body, and is fastened to the link. On the other hand, tongue 133 has a length sufficient to permit the concave spherical inner surface of the mating link to move to a maximum bending angle. Tongue 133 is engaged with, and capable of smoothly moving in, a groove 134 cut out in the mating link. With this construction, the links are prevented from rotating relative to each other, and with spacers 131 in used, the flexible sheath can be bent only in a two-dimensional manner and without back bending.

The structure shown in FIGS. 29–45 provides a flexible support capable of stably following up any kind of movement by using basic common links while making various modifications in the performance of the links by means of pins or spacers which are engaged to the links. For the flexible sheath as a whole, a construction permitting non-dimensional, two-dimensional or three-dimensional movement can be freely selected at any desired position along the length of the sheath, and the sheath can be flexibly adapted to the robot on other machine with which it is to be used.

The shape of the links shown in FIGS. 29–45 is merely an example, and a variety of modifications can be made, such as described above with reference to other examples.

Figure 46:
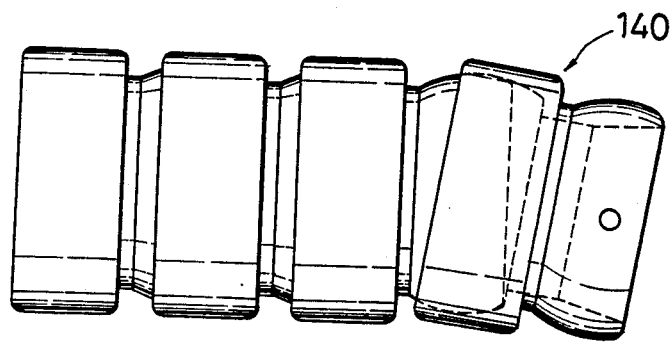
FIG. 46 is an elevational view of portion of a sheath in accordance with the invention, in which the convex spherical surfaces of the links have recesses.
Figures 47A, 47B:
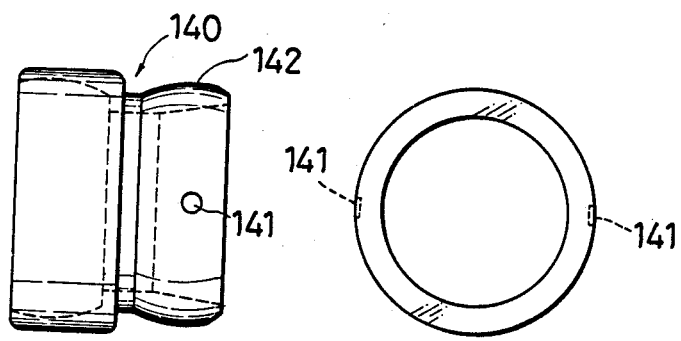
FIGS. 47A and 47B are respectively front and right side elevational views of one link of the sheath of FIG. 46.
Figure 50:
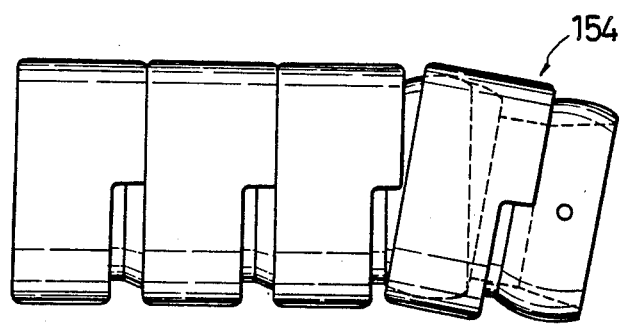
FIG. 50 is an elevation of a portion of a sheath in accordance with the invention in which the links have projections and recesses as in FIG. 48, and in which the links also have stopping surfaces for preventing reverse bending of the sheath.
Figures 51A, 51B, 51C:
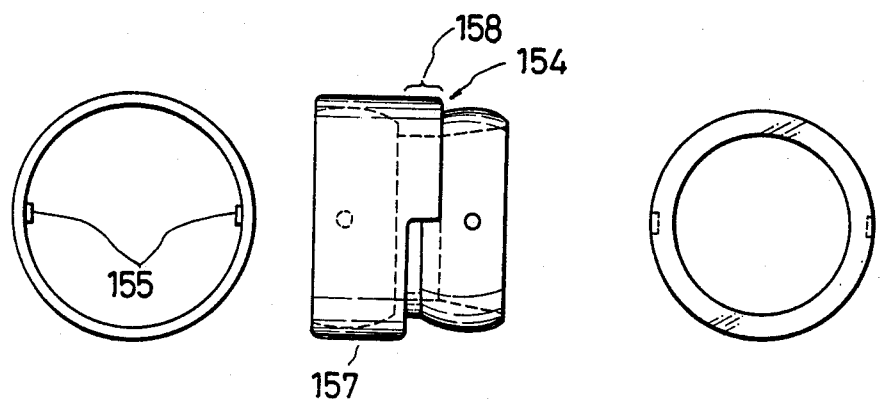
FIGS. 51A, 51B and 51C are respectively front, right side and left side elevational views of the sheath of FIG. 50.

When links 140, shown in FIGS. 46, 47A and 47B, are interconnected, the links can be articulated three-dimensionally in arbitrary directions to the extent of a fixed minimum bending radius. In addition, the links can be rotated relative to each other.

The link 140 is provided with an opposed pair of recesses 141 in a convex spherical surface 142, for engagement with any of a variety of links shown in FIGS. 48-53B.

When the links 143 shown in FIGS. 48, 49A, 49B and 49C are interconnected, the links can be articulated in one direction, and the sheath is two-dimensionally flexible in the vertical direction as viewed in FIG. 48 to a fixed bending radius. Bending takes place on an axis through the center of the mating concave and convex spherical surfaces. Links cannot be rotated relative to each other.

Each link 143 is provided with an opposed pair of projections 145 located along a line through the central axis if the link on concave spherical surface 147. Each link also has an opposed pair of recesses 148 at symmetrical positions along a line through the central axis of the link on convex spherical surface 149. When the links 56 are interconnected, the projections 145 are loosely fitted in the recesses 148. The diameters of the projections 145 are small enough, as compared with the diameters of the recesses 148, to permit easy bending, and the tip of each projection is so sized as to touch the mating convex spherical surface lightly.

Figure 63A:
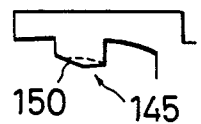
FIGS. 63A and 63B are enlarged schematic views showing additional details of a typical projection and recess respectively.
Figure 63B:
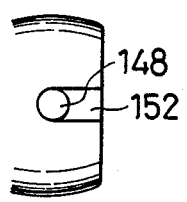

As for the head profile of projection 145, as shown in FIG. 63A, the head is chamfered at 150 in a tapered form on the insertion side over about one-half the width of the projection, to produce a semi-circular chamfered surface. On the other hand, the recess 148 is provided with a tapered guide surface 152 for insuring easy guiding of projection 145 from the end face to the recess, as shown in FIG. 63B. This structure facilitates the insertion of the projection and the connection of the links.

When links 154 shown in FIGS. 50, 51A, 51B and 51C are interconnected, the links can be bent in one direction on an opposed pair of projections 155 at the bending axis, but cannot be bent in the opposite direction. The links 66 cannot be rotated relative to each other.

Link 154 differs from link 143 in that the large diameter part 157 of link 154 has a stop 158 projecting in the longitudinal direction for inhibiting bending between the links. Stop 158 extends over a circumferential angular range of about 180° and produces a "no back bend" structure in which bending in one direction is permitted, but bending in the opposite direction is prevented. By changing the width of the stop 158, a structure capable of allowing back bend having any desired limit can be obtained.

In the other structural respects, the link 154 is the same as the link 143.

Figure 52:
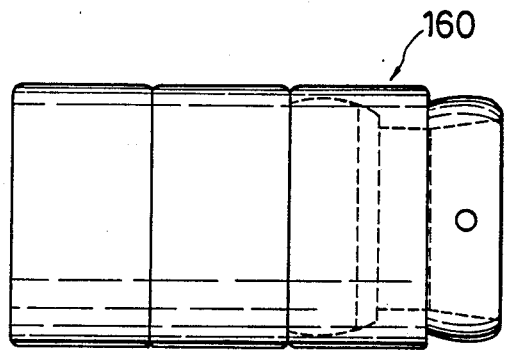
FIG. 52 is an elevational view of a portion of a sheath in accordance with the invention which is non-articulating, but which is can be mated with articulating links.
Figures 53A, 53B:
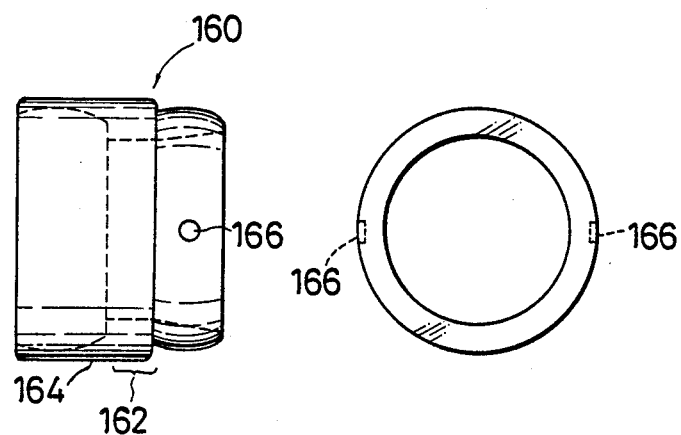
FIGS. 53A and 53B are respectively front elevational and right side elevational views of a link from the sheath of FIG. 52.

When links 160 shown in FIGS. 52, 53A and 53B are interconnected, a sheath section not bendable in any direction can be obtained.

As compared to the link 158, link 160 may be described as one in which a stop 162 projecting in the longitudinal direction is provided over the entire circumference of the large diameter part 164 whereby no gap is left between the adjacent links. Recesses 166 are provided for engagement with the projections of other links.

Links 140, 143, 154 and 160 may be interconnected in desired combinations to stabilize the moving paths of the sheath so produced to permit three-dimensional motion and rotation and to achieve various desirable sheath characteristics.

FIGS. 54 to 62E show assembly views and elemental views of links constituting another group of examples of the invention.

When links 167 shown in FIGS. 54, 55A, 55B and 55C are interconnected, the links can be bent to a fixed radius of bend in an arbitrary direction.

The adjacent links 167 can be rotated about the sheath axis to a limiting angle $\theta$ relative to each other, so that the number of links required for a 360° rotation of the entire body of interconnected links is $360/\theta°$.

The concave spherical surface 169 is provided at its inner part with an opposed pair of projections 170 at positions angularly shifted 90° from the bending axis, while the convex spherical surface 172 is provided at its outer surface with substantially rectangular recesses 173.

Figure 54:
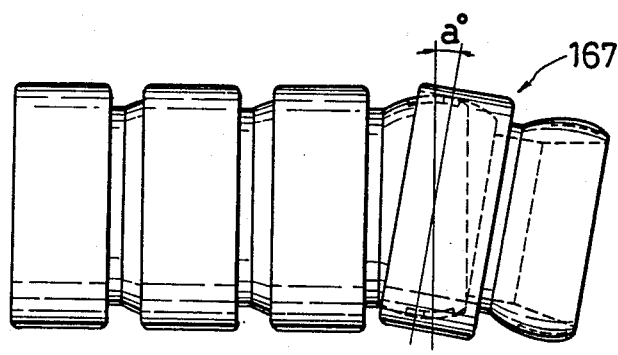
FIG. 54 is an elevational view of another embodiment of a sheath in accordance with the invention in which the concave spherical surfaces have inward projections, and in which the convex spherical surfaces have rectangular slots permitting both limited articulation and rotation.
Figure 64:
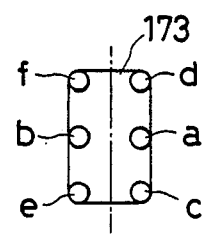
FIG. 64 is a schematic view showing the relationship between a rectangular recess and a projection.

The action obtained through the engagement of projection 170 and the recess 173 is explained by referring to FIG. 64 as follows: when the projection 170 makes a movement from a to b, the links are bent through an angle $\alpha°$ (see FIG. 54).

Figures 55A, 55B, 55C:
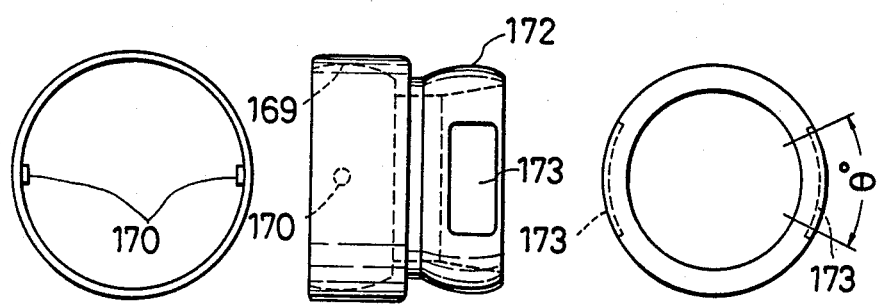
FIGS. 55A, 55B and 55C are respectively front, right side and left side elevational views of a link from the sheath of FIG. 54.
Figure 58:
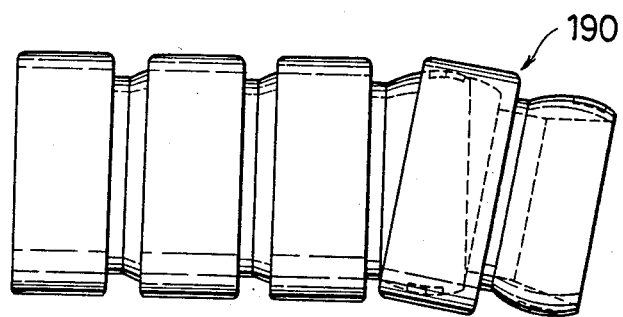
FIG. 58 is an elevational view of a sheath in which the concave spherical surfaces have inward projections, and in which the convex spherical surfaces have elongated slots positioned to allow two dimensional articulation, but to prevent reverse bending.
Figures 59A, 59B, 59C:
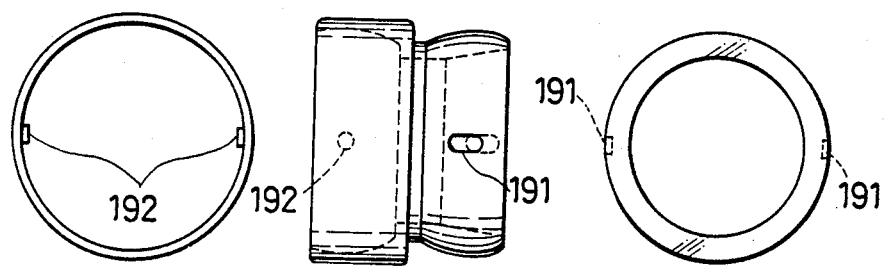
FIGS. 59A, 59B and 59C are respectively front, right side and left side elevations of a link from the sheath of FIG. 58.
Figure 60:
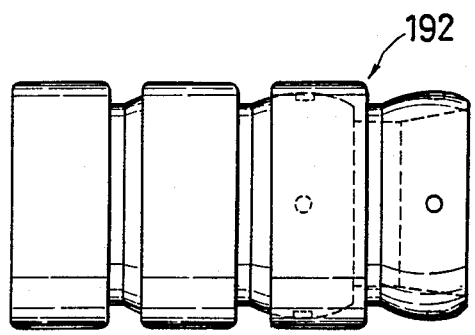
FIG. 60 is an elevational view of a portion of a sheath in accordance with the invention in which the concave spherical surfaces have inward projections mating with recesses in the convex spherical surfaces in such a way as to prevent articulation altogether.
Figures 61A, 61B, 61C:
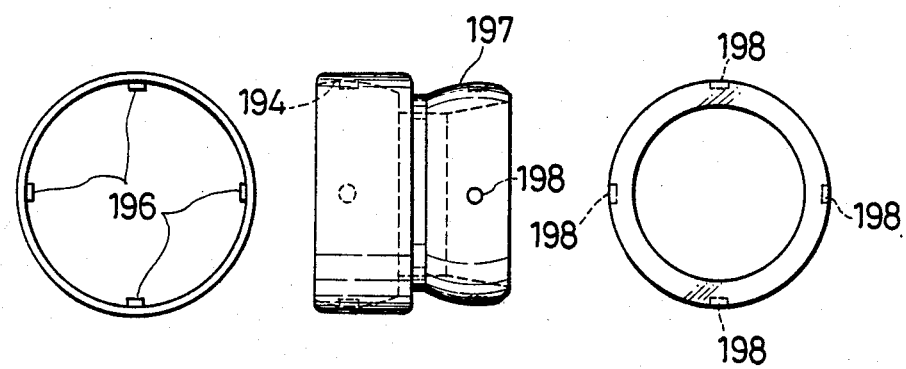
FIGS. 61A, 61B and 61C are respectively front, right side and left side elevations of a link from the sheath of FIG. 60.

In addition, when the projection 170 makes a movement from c to d or e to f in the recess 173, each link can perform a rotation through an angle $\theta$ (see FIG. 55B).

When links 180 shown in FIGS. 56, 57A, 57B and 57C are interconnected, the links can be bent in one direction (the vertical direction in FIG. 11) to a fixed bending radius but the links cannot be rotated relative to each other.

Figure 65:
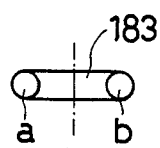
FIG. 65 is a schematic view showing the relationship between an elongated recess and a projection.

The link 180 is provided, at an outer part of its convex spherical surface 182, with a pair of recesses in the form of slots 183 at symmetrical positions such that the recesses 183 can be engaged with symmetrically opposed projections 185. As shown in FIG. 65, when the projection 185 makes a movement from a to b in the mating recess, the links can be bent through an angle $2\alpha$.

Link 180 differs from the link 167 in the shape of the recesses.

When links 190 shown in FIGS. 58, 59A, 59B and 59C are interconnected, the resultant link body has a "no-back-bend" structure which can be bent in one direction but not in the opposite direction.

Figure 66:
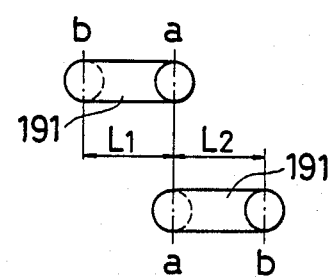
FIG. 66 is a schematic view showing the relationships between the elongated recesses and projections of the links in FIG. 58, in which reverse bending is prevented.
Figure 67:
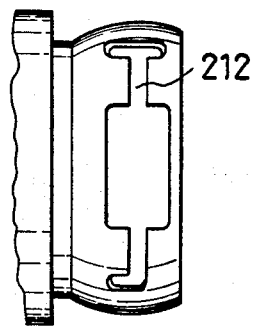
FIG. 67 is a fragmentary elevational view of a link having a complex form of slot.

One of a pair of recesses 191 is a slot extending to the left from a neutral line, while the other is a slot extending to the right from the neutral line. When a pair of projections 192 make a movement from a to b, as shown in FIG. 66, the links 190 can be bent to a predetermined limiting angle relative to each other. The lengths $L_1$ and $L_2$ are equal, but by varying the length, any desired bending fixed radius limit can be achieved. Link 190 differs from the links 167 and 180, only in the shape and location of the recesses.

When links 192 shown in FIGS. 60, 61A, 61B and 61C are interconnected, a non-bendable, self-supporting sheath section is formed.

Concave spherical surface 194 is provided at two pairs of opposed projections 196. Convex spherical surface 197 is provided at its outer part with four round recesses 198 at positions suitable for engagement with the projections 196. (Of course, three, or more than four projections and a corresponding number of recesses can be provided.)

When the links 192 are interconnected, the four projections and the four round recesses are snugly engaged to each other, so that the links cannot be moved in the longitudinal or the transverse direction relative to each other, and a self-supporting property is achieved.

Projections on link 192 are removed by cutting or the like while leaving one opposed pair of projections, so that link 192 can be coupled to a link corresponding to links 167, 180 or 190.

To facilitate insertion of the projections into the recesses, links 160, 167, 180 or 192 mentioned above can be provided with the same insertion facilitating structure as shown in FIGS. 63A and 63B.

FIGS. 62A, 62B, 62C, 62D and 62E show a link 200 which has all the characteristic features of links 167, 180, 190 and 192.

This link is characterized in that the same basic link can be used in various ways for one-dimensional, two-dimensional and three-dimensional motions.

Four pairs of opposed recesses are provided on the convex spherical surface. The shapes of recesses are different for different pairs.

Round holes 202 are provided for one-dimensional use. Slots 204 are provided for two-dimensional use. Two-dimensional slots 206 are provided for no-back-bend use. Rectangular recesses 208 are provided for three-dimensional use.

When the projections of a link are inserted in the recesses of the mating link which have respective characteristic features, the movable range of the projections is restricted, and link motions conforming to the desired purpose can be performed.

The links are interchangeable and can be interconnected as desired. Therefore, recoupling of the links to conform to a given purpose can be easily carried out in situ.

In addition, the tips of the projections are so set as to touch the bottoms of the recesses lightly in a loose fitting manner. Articulation of the links therefore takes place smoothly. Since the projections are inserted and engaged in recesses, the links are resistant to slipping apart under load.

Links 200 can be used in a one-dimensional manner by insertion of an annular spacer between adjacent links, and providing at least one projection (pin) in addition to the opposed pair of projections 210 (FIG. 62C) by driving the pin or pins into a drilled hole or holes. However, the links 200 as they are can cope with two-dimensional and three-dimensional motions.

In order to change the characteristics of the engaged links by rotating the links, passages 212 may be provided conforming to the widths of the projections so that the projections can be moved between the recesses. With this arrangement, each projection engaged with a given recess can be easily engaged to another recess suitable for the purpose, by slightly rotating the links while maintaining the connection of the links.

The relationship between the projections and the recesses which are provided respectively on the concave spherical surface side and the convex spherical surface sides in the figures, may be reversed.

The links of the sheath can be composed of various materials including metals. However synthetic polymers are preferred for most applications.

In addition, the link shapes shown in the figures are merely specific examples, and various modifications can be made, such as described with reference to the other embodiments described herein.

We claim:

1. A flexible supporting sheath for cables and the like comprising a series of interconnected hollow links forming a continuous hollow passage characterized by the fact that each one of said links has an inner concave part at one end, said inner concave part having a spherical surface, and an outer convex part at its opposite end, said outer convex part also having a spherical surface, and in which the convex part of at least one of said links is engaged with a concave part of an adjacent one of said links, in which the centers of the spherical surfaces of the engaged convex and concave parts coincide, in which the concave part of said adjacent link overlaps the convex part of said one of said links to an extent such as to prevent separation of said links, in which each of said links comprises first and second articulable link elements, the said inner concave part of each link being at one end of the first link element thereof, the said outer convex part of each link being at one end of the second link element thereof, the opposite end of said first link element having a second inner concave spherical part, the opposite end of said second link element having a second outer spherical convex part, and said second concave and convex parts being concentric, engaged with each other, and overlapping to an extent such as to prevent separation of said link elements, and in which a ring-like projection is formed on the exterior of said second link element adjacent to said second outer spherical convex part, said projection being engageable by an edge of said second inner concave spherical part to limit articulation of said link element, and having a link with an inner concave part engaged with the outer convex part at said one end of the second link element, and in which the same ring-like projection is also located adjacent to said outer convex part at said one end of the second link element and engageable by an edge of the concave part with which the last-mentioned convex part is engaged, to limit articulation of the last-mentioned concave and convex parts.

2. A flexible supporting sheath for cables and the like comprising a series of interconnected hollow links forming a continuous hollow passage characterized by the fact that each one of said links has an inner concave part at one end, said inner concave part having a spherical surface, and an outer convex part at its opposite end, said outer convex part also having a spherical surface, and in which the convex part of at least one of said links is engaged with a concave part of an adjacent one of said links, in which the centers of the spherical surfaces of the engaged convex and concave parts coincide, in which the concave part of said adjacent link overlaps the convex part of said one of said links to an extent such as to prevent separation of said links, in which each of said links comprises first and second articulable link elements, the said inner concave part of each link being at one end of the first link element thereof, the said outer convex part of each link being at one end of the second link element thereof, the opposite end of said first link element having a second inner concave spherical part, the opposite end of said second link element having a second outer spherical convex part, and said second concave and convex parts being concentric, engaged with each other, and overlapping to an extent such as to prevent separation of said link elements, in which an outer convex part of a link in said series is concentrically and overlappingly engaged with the inner concave part at said one end of said first link element, and in which a ring-like projection is formed on the interior of said first link element adjacent to both of the inner concave spherical parts thereof, said ring-like projection having annular surfaces facing in both directions along the axis of said first link element, one of said annular surfaces being engageable by an edge of said second convex part to limit articulation of said link elements, and the other of said annular surfaces being positioned for engagement by an edge of said convex link part engaged with said inner concave part at said one end of the first link element.

3. A flexible supporting sheath according to claim 2 in which the radially innermost edges of said ring-like projection are chamfered.

* * * * *